US012318029B2

(12) United States Patent
Chavez et al.

(10) Patent No.: US 12,318,029 B2
(45) Date of Patent: Jun. 3, 2025

(54) PERSONAL SUPPORT DEVICE WITH ELONGATE INSERTS

(71) Applicant: Abad Foam, Inc., Buena Park, CA (US)

(72) Inventors: Cesar A. Chavez, Yorba Linda, CA (US); Jonathan J. Amendola, Denver, CO (US); Jerry L. White, Orange, CA (US)

(73) Assignee: Abad Foam, Inc., Buena Park, CA (US)

(*) Notice: Subject to any disclaimer, the term of this patent is extended or adjusted under 35 U.S.C. 154(b) by 1243 days.

(21) Appl. No.: 16/849,641

(22) Filed: Apr. 15, 2020

(65) Prior Publication Data

US 2021/0059441 A1    Mar. 4, 2021

Related U.S. Application Data

(63) Continuation of application No. 16/509,274, filed on Jul. 11, 2019, now Pat. No. 10,660,461.

(Continued)

(51) Int. Cl.
    *A47G 9/10*      (2006.01)
    *A47C 7/38*      (2006.01)
    (Continued)

(52) U.S. Cl.
    CPC ............ *A47G 9/10* (2013.01); *A47C 7/383* (2013.01); *B29C 44/5627* (2013.01); *B68G 1/00* (2013.01);
    (Continued)

(58) Field of Classification Search
    CPC ............ B26D 7/0625; B26D 2003/285; B26D 2003/287; B26D 3/28; B26D 3/006;
    (Continued)

(56) References Cited

U.S. PATENT DOCUMENTS 2,147,362 A    2/1939   Bloomberg
2,692,328 A * 10/1954   Jaye ................. B26D 7/0616
                                             62/320

(Continued)

FOREIGN PATENT DOCUMENTS

CA          995 884 A    8/1976
JP          0568370 U    9/1993
(Continued)

OTHER PUBLICATIONS

Supplementary Search Report in corresponding European Patent Application No. 20748825, dated Oct. 4, 2022, in 8 pages.

(Continued)

*Primary Examiner* — Jason L Vaughan
(74) *Attorney, Agent, or Firm* — Knobbe, Martens, Olson & Bear, LLP

(57) ABSTRACT

A comfort device comprising a plurality of elongate inserts is disclosed herein. The comfort device can include one or more compartments configured to store the plurality of elongate inserts. The plurality of elongate inserts can have a length and a cross-section, where the cross-section has a cross-sectional area and a plurality of dimensions. The length of the inserts can be at least eight inches and at least eight times a greatest dimension of the cross-sectional area. The comfort device can include one or more openings and fastening mechanism corresponding to the one or more openings. The plurality of elongate inserts can generate tensional force in response to a force applied to the comfort device, thus providing improved elasticity for the comfort device.

18 Claims, 13 Drawing Sheets

Related U.S. Application Data

(60) Provisional application No. 62/800,213, filed on Feb. 1, 2019.

(51) Int. Cl.
   *B29C 44/56* (2006.01)
   *B68G 1/00* (2006.01)
   *B68G 7/05* (2006.01)

(52) U.S. Cl.
   CPC .............. *B68G 7/051* (2013.01); *A47C 7/38* (2013.01); *A47G 2009/1018* (2013.01); *B68G 2001/005* (2013.01)

(58) Field of Classification Search
   CPC .......... B26D 3/008; B26D 3/18; B26D 3/185; B26D 3/20; B26D 3/22; B26D 3/225; B26D 3/282
   See application file for complete search history.

(56) References Cited

U.S. PATENT DOCUMENTS

| | | | | |
|---|---|---|---|---|
| 2,749,982 | A * | 6/1956 | Hardt | G01L 5/0028 83/522.11 |
| 3,025,741 | A * | 3/1962 | Wagner | B26D 3/008 83/788 |
| 3,177,109 | A * | 4/1965 | Ziegler | B29C 44/28 428/305.5 |
| 3,199,388 | A * | 8/1965 | Redfield | B26D 3/006 83/16 |
| 3,212,376 | A * | 10/1965 | Berenbak | B26D 3/006 83/578 |
| 3,298,263 | A * | 1/1967 | Stilwell | B26D 3/008 83/874 |
| 3,333,494 | A * | 8/1967 | Smith | B26D 3/006 83/171 |
| 3,461,026 | A | 8/1969 | Schick | |
| 3,563,837 | A | 2/1971 | Smith et al. | |
| 3,585,889 | A * | 6/1971 | Rabal | B26D 3/006 83/171 |
| 3,736,820 | A * | 6/1973 | Jung | B26D 3/006 83/730 |
| 3,788,178 | A * | 1/1974 | Pantel | B26D 3/185 83/171 |
| 3,850,061 | A * | 11/1974 | Wirstrom | B26D 3/006 83/578 |
| 3,896,934 | A * | 7/1975 | Graham | B65D 81/09 217/53 |
| 3,900,648 | A | 8/1975 | Smith | |
| 4,018,116 | A * | 4/1977 | Treffner | B26D 3/20 83/16 |
| 4,030,386 | A * | 6/1977 | Poetzsch | B26D 3/006 83/811 |
| 4,536,145 | A * | 8/1985 | Sawyer | B26D 3/28 425/289 |
| 4,862,539 | A | 9/1989 | Bokich | |
| 5,683,811 | A | 11/1997 | Hernandez et al. | |
| 5,943,775 | A * | 8/1999 | Lanahan | B26D 1/553 52/592.1 |
| 5,947,293 | A * | 9/1999 | Burchard | B29C 44/5654 264/296 |
| 6,235,391 | B1 * | 5/2001 | Contreras | B68G 1/00 428/377 |
| 6,928,678 | B1 | 8/2005 | Chang | |
| 7,222,379 | B2 | 5/2007 | DiGirolamo | |
| 7,255,917 | B2 | 8/2007 | Rochlin et al. | |
| 7,461,424 | B2 | 12/2008 | Lindell | |
| 8,342,126 | B2 | 1/2013 | Simon | |
| 8,650,999 | B2 * | 2/2014 | Tillman | B26F 1/3833 83/155.1 |
| 8,959,683 | B2 | 2/2015 | Rochlin | |
| 10,131,067 | B2 * | 11/2018 | Munteanu | B26D 1/54 |
| 10,464,229 | B2 * | 11/2019 | Gonzalez Bohme | B26D 1/0006 |
| 10,660,461 | B1 | 5/2020 | Chavez et al. | |
| 2003/0070524 | A1 * | 4/2003 | Rotter | B26D 3/28 83/781 |
| 2005/0076442 | A1 | 4/2005 | Wassilefky | |
| 2005/0123736 | A1 | 6/2005 | Rochlin | |
| 2006/0248651 | A1 | 11/2006 | Lazakis et al. | |
| 2007/0039437 | A1 * | 2/2007 | Lineberry | B26F 3/12 83/16 |
| 2008/0044619 | A1 | 2/2008 | Rochlin | |
| 2014/0283303 | A1 | 9/2014 | Rochlin | |
| 2015/0327697 | A1 | 11/2015 | Joseph | |
| 2016/0100701 | A1 | 4/2016 | McKinght | |
| 2016/0166092 | A1 | 6/2016 | Alletto, Jr. | |
| 2017/0340131 | A1 | 11/2017 | Schmidt | |
| 2018/0213954 | A1 | 8/2018 | Grinstead | |
| 2018/0345517 | A1 * | 12/2018 | Boscari | B26D 1/505 |
| 2019/0075948 | A1 * | 3/2019 | Reuben | A47G 9/0253 |
| 2020/0037796 | A1 * | 2/2020 | Reissi | A47G 9/10 |
| 2023/0115100 | A1 * | 4/2023 | Lim | A47C 27/15 5/636 |

FOREIGN PATENT DOCUMENTS

| | | |
|---|---|---|
| JP | 2011-251094 A | 12/2011 |
| KR | 20-0276056 Y1 | 5/2002 |
| KR | 10-0758780 B1 | 9/2007 |
| KR | 10-2011-0106044 A | 9/2011 |
| KR | 10-2021-0151781 A | 12/2016 |
| WO | WO 2020/160495 A1 | 8/2020 |

OTHER PUBLICATIONS

International Search Report and Written Opinion in corresponding International Patent Application No. PCT/US2020/016249, dated May 27, 2020, in 15 pages.

International Preliminary Report on Patentability in corresponding International Patent Application No. PCT/US2020/016249, dated Aug. 12, 2021, in 11 pages.

* cited by examiner

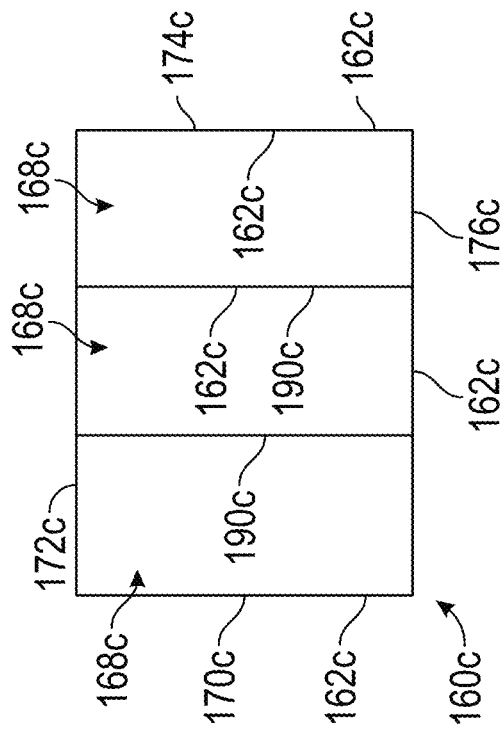
FIG. 4C
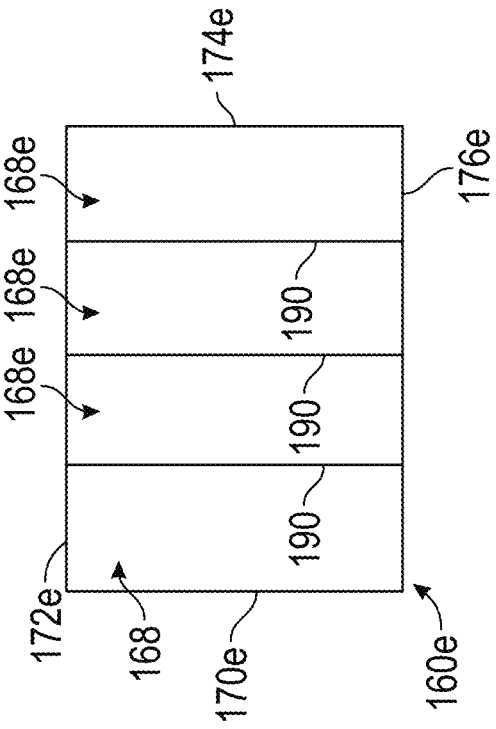
FIG. 4E
FIG. 4B
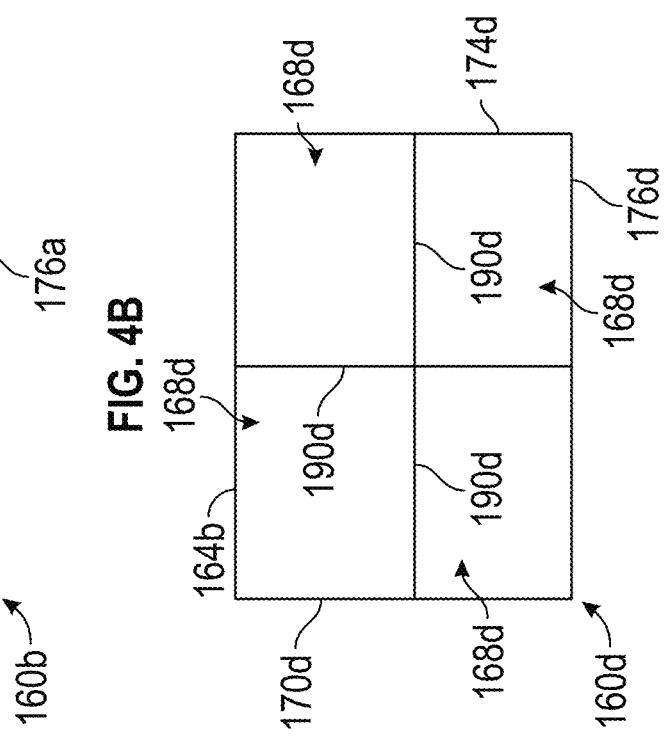
FIG. 4D

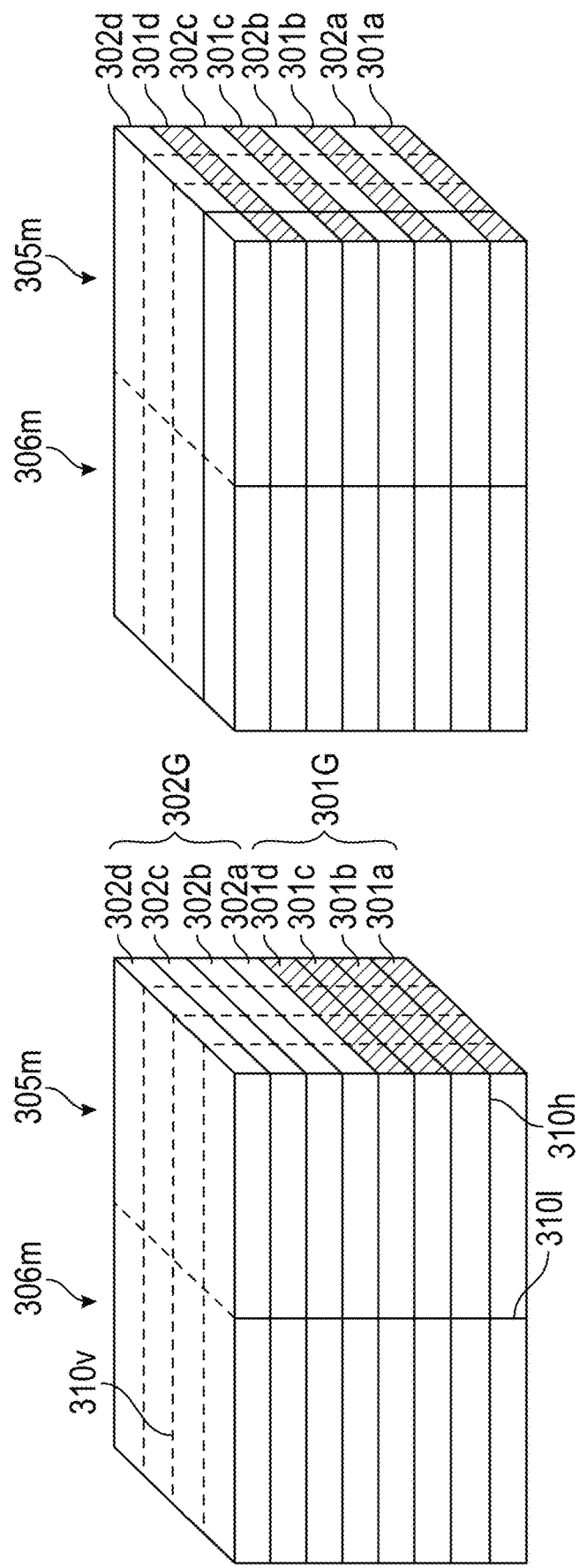

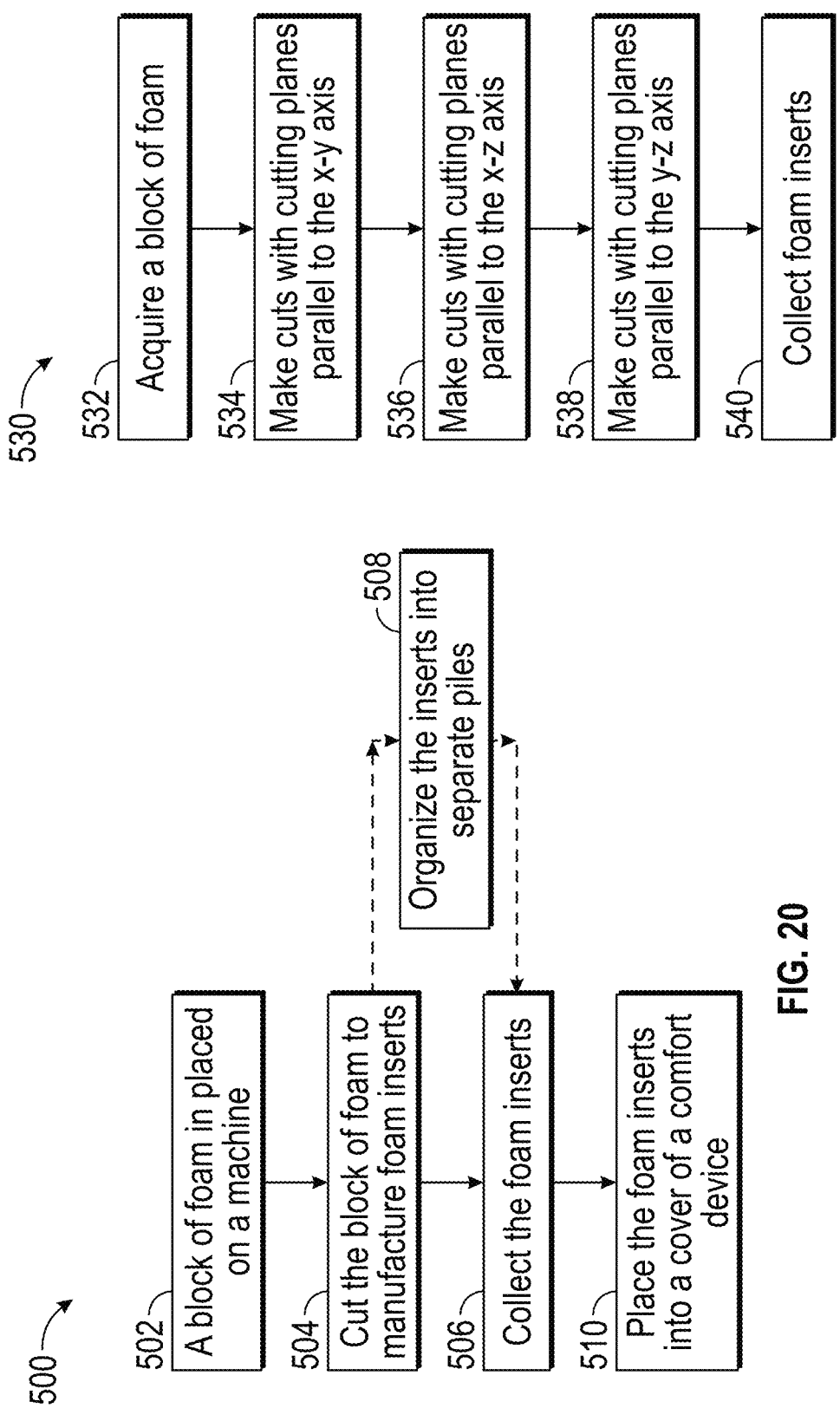

PERSONAL SUPPORT DEVICE WITH ELONGATE INSERTS

FIELD OF THE DISCLOSURE

The present disclosure relates to personal support devices such as pillows and other types of cushions filled with a plurality of elongated inserts of resilient material.

BACKGROUND

Personal support devices, such as pillows and cushions are used for providing comfort for users when seated or lying down. Some such pillows and cushions are filled with different types of inserts having different material properties and characteristics are used to provide users different levels of support and comfort. It is desirable to have an insert that retains its volume and cushioning characteristic over time, while being breathable and washable. Various configurations, materials, and shapes have been proposed or implemented to provide adequate support and comfort to the users.

SUMMARY OF THE INVENTIONS

The present disclosure includes, embodiments of systems, devices, and methods for manufacturing cushions having a plurality of elongate inserts for providing physiological support for a user.

An aspect of at least one of the embodiments disclosed herein includes the realization that using elongated ribbons of resilient material as fill for a personal cushion device can provide unexpected benefits. For example, in this context, it is significant to note that some conventional personal cushion devices, such as pillows, are often filled with small, randomly-sized pieces of foam scrap. Such foam scrap, such as those illustrated in FIG. 1, can have a size of about ½ to about 1½ inches in diameter. Such pieces have random shapes and thus, although the size of the pieces is characterized here as a diameter, such pieces are not necessarily spherical or even round. Rather, such pieces can be many different random sizes and shapes.

Another aspect of at least one of the inventions disclosed herein includes the realization that such small, randomly shaped pieces of resilient material are largely loaded only in compression or shear during use and also suffer from durability issues, resulting in breakdown and release of dust. For example, a conventional personal cushion device filled with such small, randomly sized pieces of material, is loaded in compression, when a user rests their head on the pillow. Under such a compression, the small, randomly sized pieces of material are largely loaded only in compression and shear. The resulting stresses on such small randomly sized pieces of material, usually open cell foam, results in undesirable breakdown and release of dust. This is due to the greatly reduced, effective cross sectional areas that result from resulting the grinding or shredding processes which concentrate the forces generated by loads onto small cross sectional areas thereby further concentrating the resulting stresses and increasing the likelihood of failure.

An aspect of at least some of the inventions disclosed herein includes the realization that filling a personal cushion device with pieces of resilient material having a length larger than about 6 inches, results in an improved personal cushion device. For example, a personal cushion device can be filled with pieces of resilient material having a length larger than about 6 inches, disposed in random, entangled orientations, can result in an increased likelihood that some of the pieces of material are loaded partially in tension during use. For example, elongated pieces of resilient material, when used as fill for a personal cushion device such as a pillow, and disposed in random orientations, will be entangled with each other. Such entanglement can result in some pieces having a first end entangled with other pieces disposed near a periphery of the cushion and a second end entangled with other pieces disposed closer to a center of the cushion. When the cushion is depressed in the center, the second end of the elongated piece is pulled downward with the central pieces and the first end remains substantially stationary with the peripheral pieces. As such, the elongated piece can be loaded in tension. This elongation can be similar to the loading of springs at the periphery of a trampoline, and thus can cause a reactionary stretching/loading of the elongated ribbons in the personal cushion device. Such tensile loading of the elongated ribbons can result in larger elastic elongations than possible under compression loading resulting from small particulate-fill compositions used in known pillows. As such, in some embodiments, a different cushioning performance can be achieved with compared to cushions filled with small randomly sized pieces.

Another aspect of at least one of the inventions disclosed herein includes the realization that elongated ribbons, when used as fill for personal cushion devices, can provide better airflow through the cushion during use. For example, an aspect of at least one of one of the inventions disclosed herein includes the realization that when elongated resilient members, for example, having a length larger than about 6 inches, are used as fill for personal cushion device, the elongated members become entangled, similar to strands of spaghetti in a bowl of spaghetti. The elongated members often lie in orientations extending through rounded curves, thereby generating air gaps between adjacent elongated members. The air gaps formed in parts of the cushion that are not compressed, define open air passages therebetween, supporting some airflow therethrough. Airflow through pillow is beneficial and desirable to some users who prefer "cooler" pillows or cushions.

Another aspect of at least one of the inventions disclosed herein includes the realization that elongated resilient members used as fill for personal cushion devices can be more easily manufactured when they have shapes with outer surfaces that are alignable into continuous planes when they are stacked. For example, some known pillows include elongated fill members that have round cross sections. Elongated members with such a cross sectional shapes are typically punched or drilled from foam material. Alternatively, other roughly round cross sectional shapes (e.g., pentagonal, hexagonal, heptagonal, octagonal, etc.) could be formed by cutting with a cutting tool that is moved through virgin material with non-linear cuts. However, such a cutting technique is difficult to perform, slower and results in additional waste. In contrast, in accordance with at least one embodiment disclosed herein, an elongated resilient member can be formed with a cross section having sides that are alignable into continuous planes when stacked. Such cross sections could be rectangular, square or triangular. Elongated members with such cross sectional shapes can be cut from blocks of virgin material with a plurality of straight, planar cuts. This results in a significantly accelerated, less expensive, and less wasteful manufacturing process.

Another aspect of at least one of the inventions disclosed herein includes the realization that resilient members used for as fill within personal cushion devices can degrade over time, partly due to tearing. Tearing of resilient members used as fill within personal cushion devices results when stress on such resilient members exceeds the maximum tensile or compressive strength of the member. Loading of a foam material, in particular an open cell foam material, results in all stresses being concentrated on the remaining cell walls within the internal structure of the foam.

An aspect of at least one of the inventions disclosed herein includes the realization that loads imparted onto resilient material pieces within a personal cushion device, including shear and tension forces, can be sufficiently large to tear such pieces of foam when the cross-sectional area of such elongated foam pieces are less than $1/16$ square inches. When such elongated resilient members are shaped with cross-sectional areas greater than approximately $1/16$ square inches, it has been found that they withstand the loads generated during use in personal cushion device for significantly longer life span without tearing. As such, such personal cushion devices including elongated fill material having a length of at least about 6 inches and a cross-sectional area of the least $1/16$ square inches, have a significantly longer life span without tearing, and generate less dust.

In some embodiments, the comfort device can comprise the following: (i) an outer cover comprising an upper sidewall and a lower sidewall; (ii) a first internal compartment within the cover between the upper sidewall and the lower sidewall; (iii) an opening disposed in the outer cover, opening into the internal compartment of the outer cover; (iv) a fastening assembly disposed at the opening comprising at least a first fastening element, the fastening element being moveable between opened and closed positions; and (v) a plurality of elongated inserts disposed in the first internal compartment of the outer cover, the plurality of elongated inserts comprising an open cell foam material, a first end, a second end, an intermediate portion, and a length between the first end and the second end, the plurality of elongate inserts having a length of at least 8 inches, the plurality of elongated inserts having a cross-section extending perpendicular to the length of the plurality of elongated inserts, the cross-section defining a cross-sectional area of at least one-sixteenth of an inch, the cross-section also comprising at least a plurality of cross-sectional dimensions, and wherein the length is at least eight times a greatest one of the cross-sectional dimensions. Additionally, an aspect of at least one of the inventions disclosed herein includes the realization that limiting the cross-sectional area of the elongated members can provide a less lumpy and smoother appearance for the associated comfort device. Thus, in some embodiments, the elongated members have a cross-sectional area of no more than one square inch, $3/4$ of a square inch, $1/2$ of a square inch, $3/8$ of a square inch, $1/4$ of a square inch, $1/8$ of a square inch, $1/16$ of a square inch, or less. For example, a square cross-sectioned elongate member having $3/4"$ long sides would have a 0.5635 sq. inch cross sectional area, which is about $1/2$ of a square inch.

In some embodiments, the comfort device can further include one or more of the following features in any combination: (a) wherein the plurality of elongated inserts comprise a load deflection rating between 10 ILD and 40 ILD and a density between 0.5 pcf and 8.0 pcf; (b) wherein one or more of the plurality of inserts have a uniform cross section along its length; (c) wherein one or more of the plurality of insets has a non-uniform cross section along its length, for example, wherein a first end has a first cross-section, a second end has a second cross-section, an intermediate portion has a third cross-section, wherein the first cross-section and the second cross-section have the same cross-sectional shape, and wherein the third cross-section has a different cross-sectional shape than that of the first and the second cross-section; (d) wherein a plurality of the elongate inserts have varying lengths; (e) wherein the first end, the second end, and the intermediate portion of the plurality of elongate inserts have square cross-sectional shapes; (f) wherein the outer cover of the comfort device comprises one or more compartments; (g) wherein the one or more compartments have different volumes and shapes; (h) wherein the one or more compartments house elongate inserts with different elastic properties; and (i) wherein the fastening mechanism utilizes at least one of the following mechanisms: zippers, hooks, ties, Velcro, clips, buttons, clasps, straps, and pins.

In some embodiments, the comfort device can comprise the following: (i) an outer cover comprising an upper sidewall and a lower sidewall; (ii) a first internal compartment disposed within the cover between the upper sidewall and the lower sidewall; (iii) an opening disposed in the outer cover, opening into the internal compartment of the outer cover; and (iv) a plurality of elongated inserts disposed in the first compartment of the outer cover, the plurality of elongated inserts comprising an open cell foam material, a first end, a second end, an intermediate portion, and a length between the first end and the second end, the plurality of elongated inserts having a cross section defining a cross-sectional area of at least one-sixteenth of an inch, the cross-section also comprising at least a plurality of cross-sectional dimensions and wherein the length is at least eight times a greatest one of the cross sectional dimensions.

In some embodiments, a method for batch manufacturing pillows filled with a plurality of elongate inserts can be made from a block of foam cut in batches. For example, the method can comprise the following: (i) placing a block of foam material onto a cutting machine; (ii) cutting a first batch of elongate inserts wherein the first batch has a first volume sufficient for a first pillow and collecting the first batch of elongate inserts onto a first conveyor belt; (iii) moving the first batch of elongate inserts away from the block of foam material; (iv) cutting a second batch of elongate inserts from the block of foam material wherein the second batch has a second volume equivalent to a total volume of a number of elongate inserts to needed for a second pillow and collecting the second batch of elongate inserts onto the first conveyor belt; (v) wherein the first batch of elongate inserts is spaced from the second batch of elongate inserts.

Another aspect of the least one of the inventions disclosed herein include the realization that comfort devices such as cushions or pillows can be manufactured in a more efficient manner, for example, by mixing layers of different cushion materials into a larger block of cushion material, prior to cutting the block of cushion material into its final shape. For example, in some embodiments, a block of cushion material can comprise a plurality of layers of different kinds of material. Thus, when further cuts are made to the block of material, the cut pieces include a mix of the different materials of the layers. The concentrations of the amounts of the first and second materials can be changed by adjusting the number and magnitude of each plurality of layers.

In some embodiments, the block of material can be cut in a manner so as to create at least partially mixed batches of cushion members, a subgroup of the cushion members being made from a first material and a second subgroup of the cushion members being made from a second different material. In some embodiments, after the appropriate number of batches of cushion members are cut from such a multilayered, multi-material lock, the cushion members are then mixed so as to further mix and randomize their distribution. The one or more batches of cushion members can then be inserted into a cushion shell.

In some embodiments, a block of mixed cushion materials can include groups of layers of different materials. For example, a block of cushion material comprising layers of two different materials can be arranged with all of the layers of one material being adjacent to one another and all of the layers of the second material being adjacent to each other, thereby dividing the block into two groups, independent and adjacent to each other. The two groups of layers can be in direct contact, one group lying on top of or adjacent to the other.

In some embodiments, different layers of a multi-material block can be intermingled with one another prior to cutting into the final shapes. For example, a block of cushion material can include a plurality of layers of different materials with the layers arranged in an alternating pattern. Thus, when the cushion members are cut from the multilayered block, some mixing of the cushion members has already been achieved by way of the alternating arrangement of the layers of the material. Such wholly or partly premixed cushion members can be optionally mixed with a downstream mixing device prior to insertion into a cushion shell.

For purposes of summarizing the disclosure, certain aspects, advantages, and novel features have been described herein. Of course, it is to be understood that not necessarily all such aspects, advantages, or features will be embodied in any particular embodiment.

BRIEF DESCRIPTION OF THE DRAWINGS

FIG. 4B is a schematic view of a modification of the pillow of FIG. 4A having a first arrangement of internal compartments.

FIG. 4C is a schematic view of a modification of the pillow of FIG. 4A having a second arrangement of internal compartments.

FIG. 4D is a schematic view of another modification of the pillow of FIG. 4A having a third arrangement of internal compartments.

FIG. 4E is a schematic view of yet another modification of the pillow of FIG. 4A having a fourth arrangement of internal compartments.

FIG. 15 is a perspective view of a collection of layers of two different virgin resilient materials with optional cut lines for cutting the collection into groups of elongate members for filling cushions.

FIG. 16 is a perspective view of the collection illustrated in FIG. 15, with the layers being interleaved.

FIG. 20 is a flow diagram of an embodiment of a method of manufacturing personal cushion devices.

FIG. 21 is a flow diagram of another embodiment of a method of manufacturing personal cushion devices.

DETAILED DESCRIPTION

The embodiments disclosed herein are described in the context of pillows used as bedding for supporting a user's head while lying down because they have particular utility in that context. However, the inventions disclosed herein can be used in other contexts as well, for example but without limitation, as cushions for seating such as on couches, chairs, animal bedding, bean bags, and other types of furniture.

Some of the currently available types of pillow inserts include, but not limited to, down inserts, feather inserts, polyester fiberfill inserts, shredded foam inserts, buckwheat hull inserts, microbead inserts, and kapok pillow inserts. These types of inserts suffer from various types of disadvantages. For example, Down and feather inserts require consistent fluffing, can be expensive, and can provide inconsistent level of support. Polyester fiberfill inserts can clump easily, can be potentially hazardous, and do not breathe well. Buckwheat hull inserts can be heavy and too firm for some users. Microbead inserts can have unpleasant chemical odor, can potentially release dangerous chemical gases, and can have short lifespan because microbeads degenerate and flatten out with repeated use. Kapok inserts do not hold shape and can easily develop lumps, thus requiring frequent readjustments.

Figure 1:
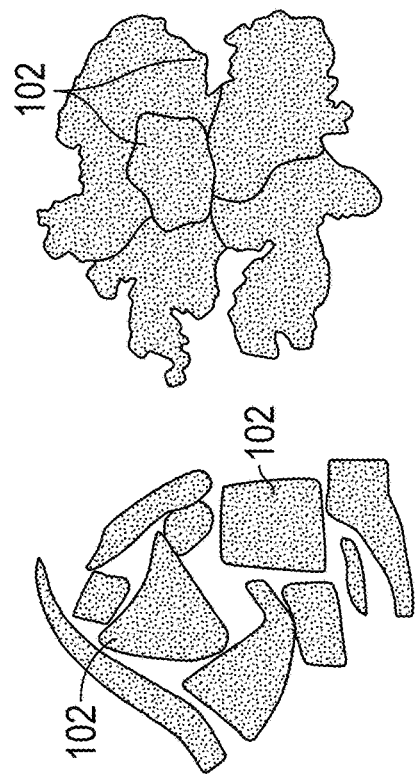
FIG. 1 illustrates two different types of foam scraps used in prior art pillows.

FIG. 1 illustrates examples of the types of different shredded foam inserts 102 used in some prior art pillows. Shredded foam inserts 102 can be manufactured using shredding machines, for example, by grinding or cutting foam pieces into randomly sized pieces. Some known pillows are manufactured with scrap foam left over from other manufacturing processes. Such cuts can be irregular resulting in shredded foam inserts 102 that are different shapes and sizes, which can be difficult and time-consuming to manufacture.

In addition, shredded foam inserts 102 are prone to tearing. An aspect of at least one of the embodiments disclosed herein includes the realization that shredded foam inserts can have cross sectional areas that are so small that the stresses generated during use can tear such shredded foam inserts. Thus, shredded foam inserts 102 often do not maintain their initial volume and shape after repeated use; they lose the ability to maintain air space/pockets as they tear and break down over time. When shredded foam pieces 102 lose the air space between them, they tend to lose the ability to maintain their initial volume and/or shape such that they cannot provide the same level of comfort.

Figure 2:
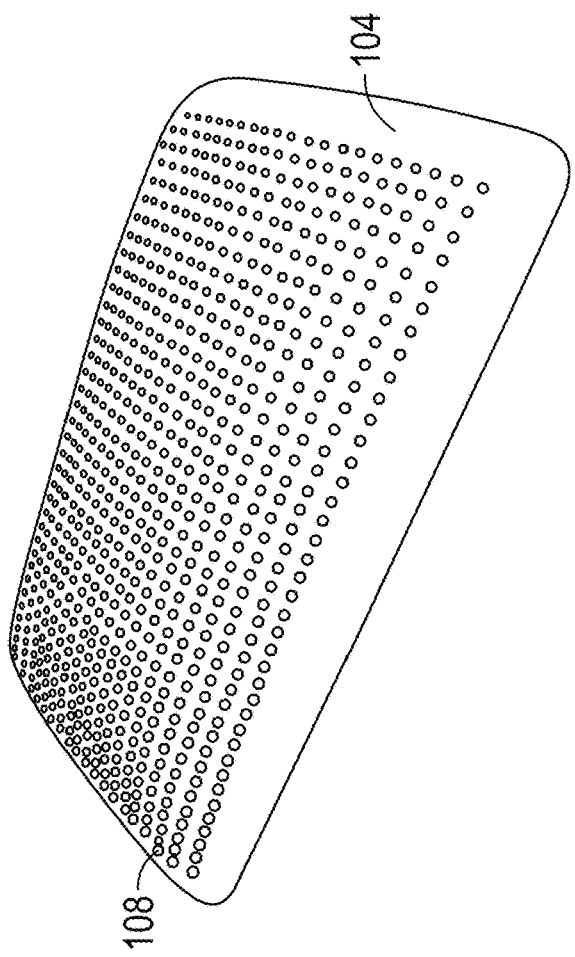
FIG. 2 illustrates a prior art, single-block type of foam insert for a pillow.

FIG. 2 illustrates a different type of prior art pillow insert 104 that is essentially a single block of foam with holes 108 punched or drilled through it. In some known pillows of this type, the insert 104 is made from one of the following materials including, but not limited to, polyurethane foam, memory foam, gel foam, latex rubber foam, convoluted phone, evlon foam, reflex foam, high density foam, high resilience phone, Supreem™ foam, rebond foam, closed cell foam, or dry fast foam. Typically, the openings 108 typically have a circular cross-section, as shown in FIG. 2.

However, pillow inserts 104 made out of the block of foam, as shown in FIG. 2, can be quite heavy and expensive. Generating the openings 108 on the pillow insert 104 can result in foam scraps in a form of short, small-cross-sectioned noodles that can be used as inserts for other types of pillows. However, such noodles tend to be much shorter and have smaller cross-section than the pillow inserts disclosed herein. Because of the size and the method of manufacturing such inserts, a number of the single block type of pillow insert shown in FIG. 2 would need to be manufactured to generate sufficient number of such elongate foam scraps (or noodles) to fill a single pillow of a similar size. Moreover, such pillow inserts 104, while capable of providing adequate level of comfort for users, can be significantly heavier than the shredded pillow inserts 102.

Figure 3A:
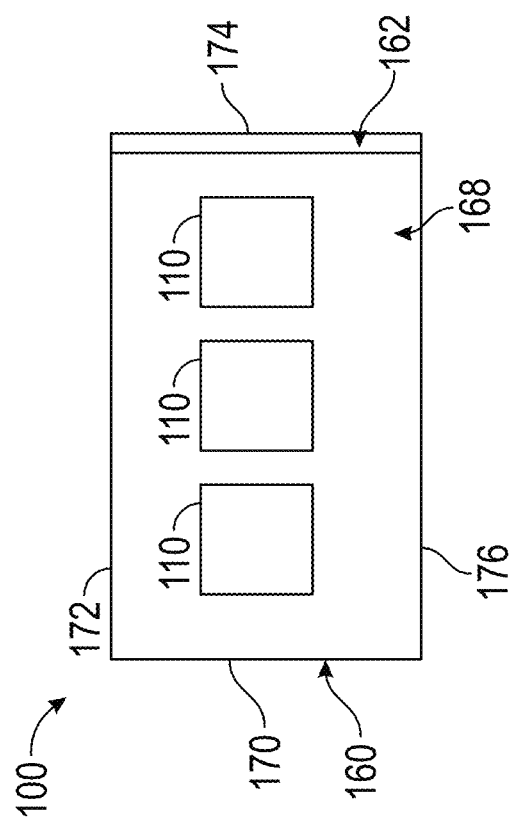
FIG. 3A is a schematic illustration of a pillow having a plurality of pillow inserts.
Figure 3B:
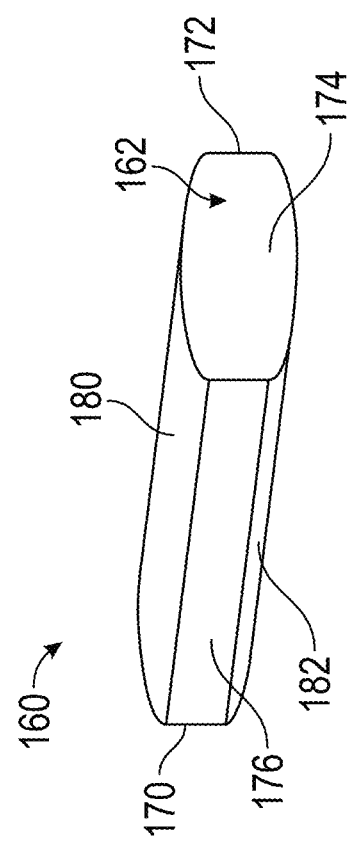
FIG. 3B is a top, right and left side perspective view of the embodiment of the pillow of FIG. 3A.

FIGS. 3A and 3B are schematic diagrams illustrating an embodiment of a comfort device 100. The comfort device 100 can comprise a cover 160 and a plurality of elongated members 110. The comfort device 100 can be a bedding pillow for supporting a user's head while lying down. However, with the appropriate sizing, the comfort device 100 can be configured for serving as a pillow or bed for a pet, the form of furniture commonly known as a "beanbag", a sofa, a seat cushion, a back cushion, or other applications including, but not limited to, automotive, office furniture, flotation devices, or sports equipment.

The cover 160 can be made out of various materials including, but not limited to cotton, nylon, polyester, linen, silk or other materials. In some embodiments, the cover 160 is made out of a breathable material. In some embodiments, the cover 160 is made out of stretchable material. The cover 160 can be substantially rectangular or circular. In other embodiments, the cover 160 can be spherical. In the context of the comfort device being in the configuration of a "bean bag" type furniture, the cover can be substantially spherical or partially spherical and partially seat-shaped. In some embodiments, the cover 160 can be configured to assume and maintain different types of shapes.

As shown in FIGS. 3A and 3B, the comfort device 100 is in the configuration of a bedding pillow for supporting a user's head while lying down. The cover 160 is substantially rectangular and/or sack-shaped, such as the shape of a conventional pillow used as for bedding. The cover 160 can include a first side 170, a second side 172, a third side 174, a fourth side 176, a first surface 180, and a second surface 182. The first side 170 can be located distal or opposite from the third side 174 and the second side 172 can be located distal or opposite from the fourth side 176. The first side 170 and the third side 174 can be facing one another while the second side 172 and the fourth side 176 can be facing one another. The first 164a, the second side 172, the third side 174, the fourth side 164c can be configured define the boundaries of the first surface 180 and the second surface 182. The first surface and the second surface 180, 182 can be arcuate. In some embodiments, the first surface and the second surface 180, 182 are substantially flat. The schematically represented configuration of sides and surfaces is just one example of cover of a pillow that can be used to form a comfort device 100. Other configurations can also be used.

In some embodiments, the first surface 180 is a top surface and the second surface 182 is a bottom surface of the comfort device 100. During use, a user might flip the comfort deice 100 over to switch the orientations of the sides 180, 182. As such, the comfort device of FIGS. 3A and 3B is configured for use in any orientation.

The first surface 180 and the second surface 182 can extend between the first side 170 and the third side 174 of the cover 160 and the first surface 180 and the second surface 182 extend between the second side 172 and the fourth side 176 of the cover 160. The first surface 180 and the second surface 182 can be substantially rectangular, each having four sides that are connected to the first, second, third, and fourth sides 170, 172, 174, 176 of the cover 160. The first surface 180 and the second surface 182 can be configured such that their inner surfaces face each other and their outer surfaces face away from each other. In some embodiments, the first surface 180 is an upper sidewall while the second surface 182 is a lower sidewall.

In other embodiments, the cover 160 includes more than four sides. In some embodiments, the cover 160 includes less than four sides. In other embodiments, the cover 160 is substantially a rectangular cuboid with six faces. The cover 160 can be circular or elliptical. In some embodiments, the cover 160 can be substantially spherical.

The cover 160 can include one or more internal compartments 168 defined within the sides 170, 172, 174, 176, and the top and bottom 180, 182. The embodiment of the comfort device 100 illustrated in FIGS. 3A and 3B includes a single internal compartment. As such, the first side 170, the second side 172, the third side 174, the fourth side 176, the first surface 180, and the second surface 182 of the cover 160 can define boundaries for the compartment 168. In some embodiments, various combinations of the first side 170, the second side 172, the third side 174, the fourth side 176, the first surface 180, and the second surface 182 of the cover 160 can define boundaries for the compartment 168.

In some embodiments, the compartment 168 of the cover 160 can contain a plurality of elongated members 110. The elongated members 110 can have one or more different cross-sectional shapes and cross-sectional areas. In some embodiments, the length of the inserts can vary. In other embodiments, all, a majority or a substantial number of the elongated members 110 have the same length. The elongated members 110 can be placed into the compartment 168 of the cover 160 via an opening 162. The opening 162 can be associated with any of the sides or the surfaces of the cover 160.

Figure 4A:
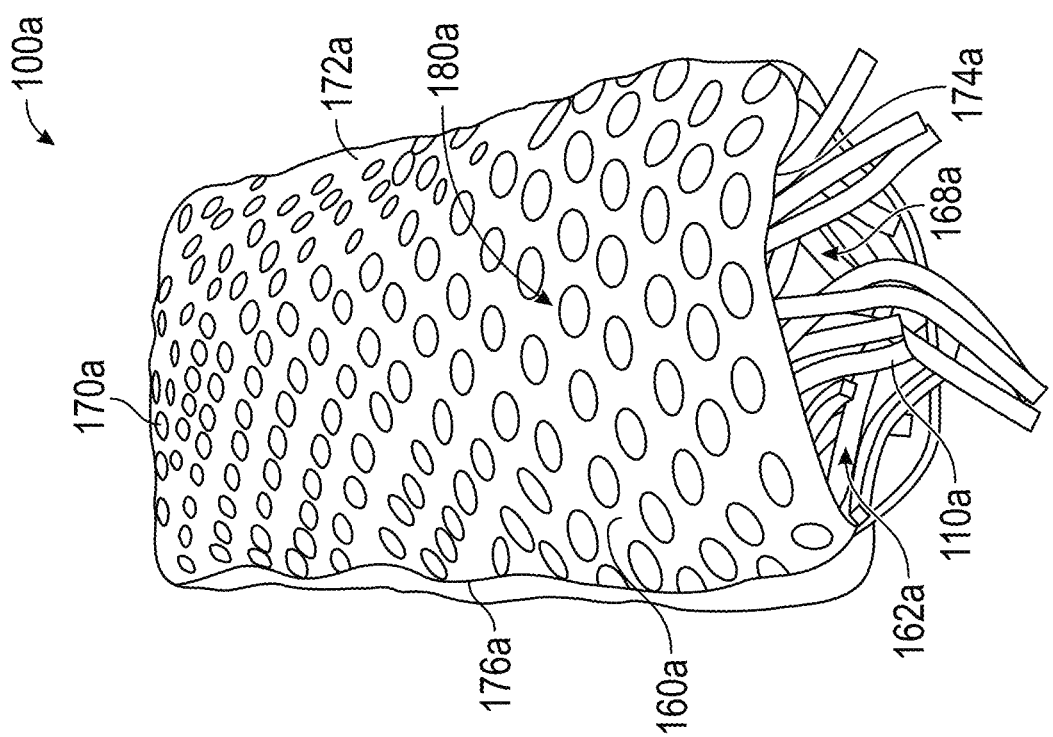
FIG. 4A is a perspective view of a modification of the embodiment of FIG. 3, in the form of a bedding pillow having a plurality of elongate pillow inserts.

FIG. 4A illustrates another embodiment of the comfort device 100 of FIG. 3, identified generally by the reference numeral 100a. Parts, components, and features of the comfort device 100a are identified using the same reference numerals as the corresponding parts, components, and features of the comfort device 100, except that a letter "a" has been added thereto. The illustrated embodiment of the comfort device 100a includes a cover 160a and elongated members 110a.

As shown in the FIG. 4A, the cover 160a can comprise an opening 162a and a fastening mechanism associated with the opening 162a. The cover can include a first side 170a, a second side 172a, a third side 174a, and a fourth side 176a. The first side 170a, the second side 172a, the third side 174a, and the fourth side 176a can define boundaries for a first surface 180a and a second surface 182b (not shown). As discussed above, the first and the second surfaces 180a and 182a can be positioned such that inner surfaces of the first and the second surfaces 180a and 182a face each other. The cover 160a can be made out of materials as described above. The cover 160a can be in different shapes including, but not limited to, cylindrical, substantially rectangular, circular, or sack-shaped such as that commonly used for bedding pillows, or any other shape. The cover 160a can have cross-sections in different shapes. For example, the cross-section of the cover 160a can be elliptical or substantially rectangular. The cover 160a can comprise different types of surface indentations to provide additional comfort and/or support for the users.

For example, as shown in FIG. 4A, the cover 160a has one or more dimples and/or protrusions to provide additional comfort and/or support. The protrusions, shown in FIG. 4A, can include different elements to provide cushioning/energy absorption. In some embodiments, such divots and/or protrusions are disposed on an outer surface of the cover 160a. In other embodiments, such divots and/or protrusions are disposed on an inner surface of the cover 160a.

In some embodiments, the opening 162a can be associated with either the first side 170a or the third side 174a of the cover 160a. The opening 162a can be dimensioned such that its length is less than or equal to the lengths of either the first side 170a or the second side 172a of the cover 160a, as is typical in the generally rectangular shape of a bedding pillow.

The fastening mechanism of the cover 160a is configured to interact with the opening 162a of the cover 160a to allow users or manufacturers to open or close the opening 162a. The fastening mechanism can have two positions corresponding to the state of the opening 162a. For example, the fastening mechanism can have an open position in which the opening 162a is open. When the fastening mechanism is in a closed position, the opening 162a is closed. In some embodiments, the fastening mechanism has more than two positions.

The fastening mechanism can be associated with either the first side 170a or the third side 174a of the cover 160a. The fastening mechanism can incorporate various types of mechanisms including, but not limited to, zippers, hooks, ties, Velcro, clips, buttons, clasps, straps, or pins. In some embodiments, the fastening mechanism is not associated with either the first side 170a or the second side 172a of the cover 160a. In some embodiments, the fastening mechanism 180 is associated with the opening 162 of the cover 160.

In some embodiments, the cover 160a can include one or more compartments 168a that are dimensioned to contain a plurality of elongated members 110a. In some embodiments, each of the compartments 168a is associated with at least one opening to allow a user to place the desired number of elongated members 110a into each of the compartments 168a. Optionally, having discrete compartments 168a within the comfort device 100a can allow a user to insert elongated members 110a with different characteristics (e.g., size, density, and/or length) within different compartments 168a. For example, the elongated members 110a with higher density may be placed within a compartment 168a located closer to the ends 170, 174 and the cover 160a while the elongated members 110a with lower density may be placed within a compartment 168a located farther from the ends 170, 174.

FIGS. 4B-4E illustrate other embodiments of the cover 160 of the comfort device 100 of FIGS. 3A and 3B, identified generally by the reference numeral 160b, 160c, 160d, and 160e. Parts, components, and features of the cover 160b, 160c, 160d, and 160e are identified using the same reference numerals as the corresponding parts, components, and features of the comfort device 100, except that letters "b", "c", "d", and "e" have been added thereto.

As shown in FIG. 4B, in some embodiments, the cover 160b has two compartments 168b separated by a divider 190. As described above, the cover 160b can comprise a first side 170b, a second side 172b, a third side 174b, and a fourth side 176b. The first compartment can be associated with a first opening and the second compartment can be associated with a second opening. In some embodiments, the compartments 168b are equal in size and volume. In other embodiments, the first compartment is larger in size and volume than the second compartment. The first compartment and the second compartment can be arranged such that they are adjacent to one another. In some embodiments, the compartments 168b can be arranged such that the first compartment is located on top of the second compartment. In some embodiments, the cover 160b has two or more compartments 168b.

FIG. 4C illustrates an embodiment of the cover 160c including three compartments 168c separated by dividers 190c. As described above, the cover 160c can comprise a first side 170c, a second side 172c, a third side 174c, and a fourth side 176c. The first compartment 168c can be associated with a first opening 162c while a second compartment 168c can be associated with a second opening 162c. In some embodiments, a third compartment can have an opening 162c associated with a side 176c of the cover 160c, or with an internal divider 190c so that the third compartment 168c opens into an adjacent compartment 168c and thus can be emptied and filled through the adjacent compartment 168c. Optionally, in some embodiments, the compartments 168c are equal in size and volume. The compartments 168c can have different sizes and volumes. The compartments 168c can be arranged such that they are adjacent to one another, as shown in FIG. 4C. However, the compartments 168c can also be arranged such that the first compartment is adjacent to a top surface of the cover 160c, the second compartment adjacent to a bottom surface of the cover 160c, and the third compartment located between the first and the second compartment. In some embodiments, the compartments 168c are stacked on top of each other.

FIG. 4D illustrates the cover 160d including four compartments 168d separated by dividers 190d. As discussed above, the cover 160d can comprise a first side 170d, a second side 172d, a third side 174d, and a fourth side 176d. A first compartment and a second compartment can be associated with a first opening 162d while a third and a fourth compartment can be associated with a second opening 162d. In some embodiments, the compartments 168d are equal in size and volume. Optionally, the compartments 168d can have different sizes and volumes. In some embodiments, the compartments 168d are arranged such that each of the four compartments 168d are generally located at four quadrants of the cover 160d. However, the compartments 168d can also be arranged with the first compartment adjacent to a top surface of the cover 160d, the second compartment adjacent to a bottom surface of the cover 160d, and the third and the fourth compartments 168d located between the first and the second compartment. In some embodiments, the compartments 168d are stacked on top of each other as shown in FIG. 4E.

Figure 5:
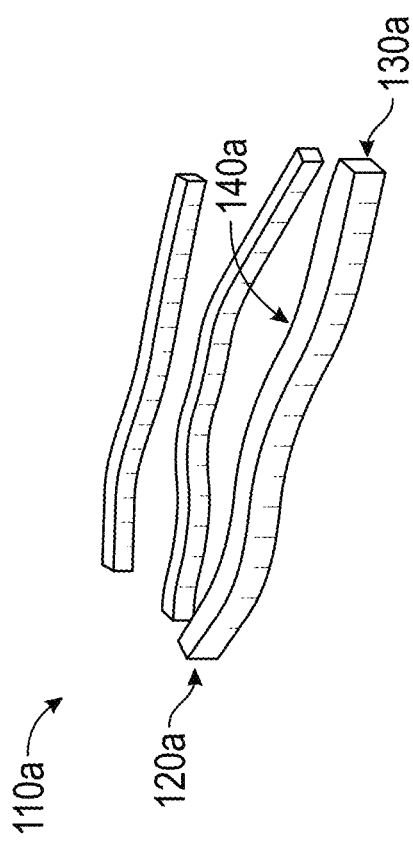
FIG. 5 is a perspective view of three embodiments of elongate pillow inserts that can be used in the embodiments of personal cushion devices disclosed herein.

FIG. 5 illustrates a perspective view of an embodiment of the elongated member 110a. The elongated member 110a can include a first end 120a, a second end 130a, and an intermediate portion 140a. The elongated members 110a can have a cross-section of any shape, including but without limitation, square, round, triangular rectangular, polygonal, or other shapes.

Optionally, in some embodiments, the elongated members 110a have a cross sectional shape defining sides that can be alignable into continuous planes. For example, triangular, rectangular, parallelogram, diamond and square cross sections define sides that can be aligned into continuous planes when such inserts are stacked with each other. Other cross sections do not provide this structural relationship. For example, if elongated members having round, oval, pentagonal or hexagonal cross sections are stacked together, the sides of adjacent members cannot be aligned along continuous planes. Rather, the sides are spaced from each other with non-uniform gaps or follow zig-zagging paths. The non-planar alignment of the sides of such elongated members when stacked is a result of those elongated members being manufactured in more complex and limited processes.

By contrast, where the elongated members 110 include sides that are alignable so as to extend continuously along planes, such elongated members can benefit from the optional advantage of manufacturing by making straight cuts through blocks of virgin material, such as foam. Exemplary manufacturing processes are described below with reference to FIGS. 14-17.

With regard to overall shape of the elongated members 110a, the first end 120a, the second end 130a, and the intermediate portion 140a of the elongated members 110a can have the same cross-section. In some embodiments, the first end 120a, the second end 130a, and the intermediate portion 140a have different cross-sections. In some embodiments, the elongated members 110a are made out of virgin resilient materials, such as, but without limitation, open cell foams that can provide more breathability, lower density, and less total weight than closed cell foams.

Figure 6:
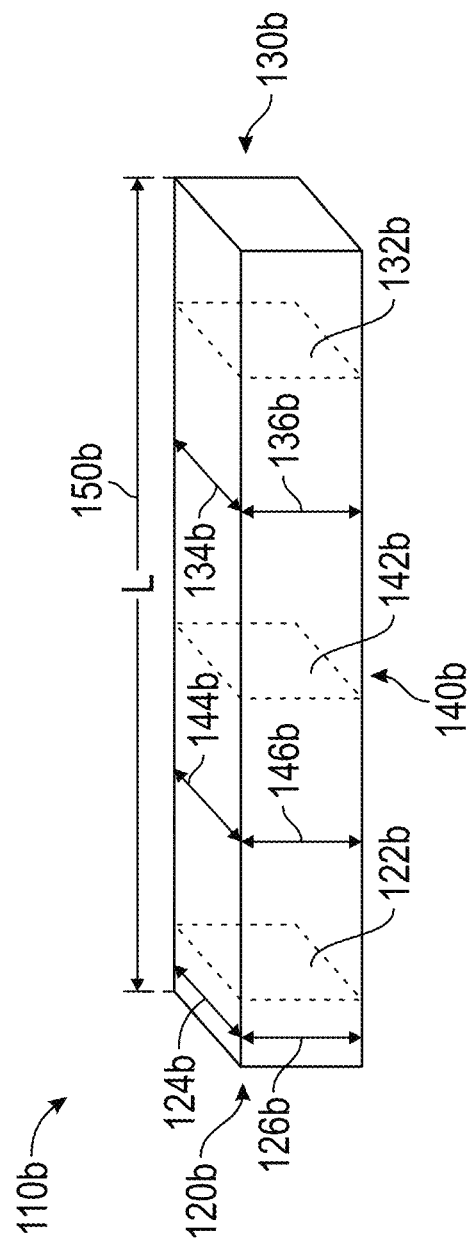
FIG. 6 is a schematic perspective view of an embodiment of an elongate insert having a rectangular cross section.
Figure 7:
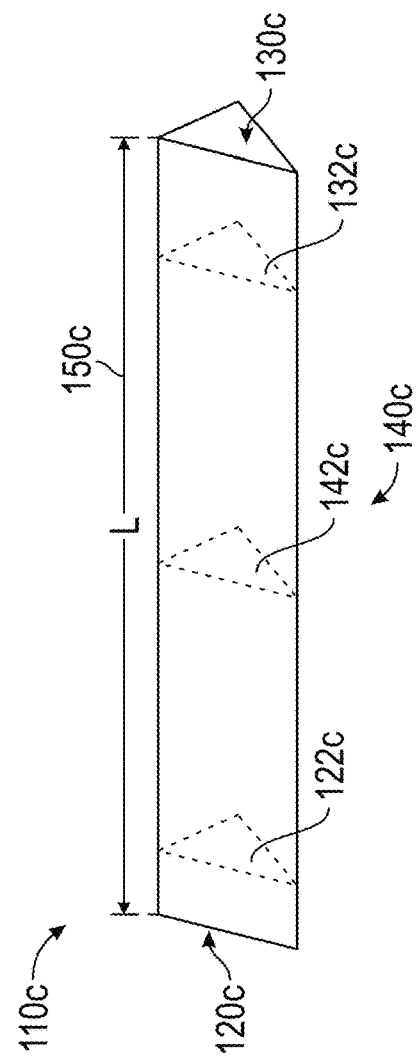
FIG. 7 is a schematic perspective view of a modification of the elongate insert of FIG. 6 having a different, triangular cross section.

FIGS. 6 and 7 are schematic diagrams of variations of the elongated members 110, detailing the cross-sectional uniformity and/or variations along their length. The variations of FIGS. 6 and 7 are identified with the reference numerals 110b and 110c. Parts, components, and features of the cover 110b and 110c are identified using the same reference numerals as the corresponding parts, components, and features of the elongated members 110a, except that letters "b" and "c" have been added thereto.

With reference to FIG. 6, the elongated member 110b can include a first end 120b, a second end 130b, and an intermediate portion 140b. The first end 120b can comprise a first cross-section 122b with a width 124b and depth 126b and the second end 130b can comprise a second cross-section 132b, with a width 134b and depth 136b. The intermediate portion 140b can comprise a third cross-section 142b with a width 144b and depth 146b. The depths and widths 124b, 134b, 144b and depths 126b, 136b, 146b can be the same or can vary from each other. In some embodiments, the widths 124b, 134b, 144b and depths 126b, 136b, 146b can be manufactured with straight edged cutting tools, yet vary due to normal cutting tool operation. In other embodiments, the widths 124b, 134b, 144b and depths 126b, 136b, 146b can vary by design.

The first end 120b, the second end 130b, and the intermediate portion 140b of the elongated member 110b can have different cross-sectional shapes including, but not limited to, square (FIG. 6), circular, elliptical, triangular (FIG. 7), or hexagonal. In some embodiments, the first cross-section 122b, the second cross-section 132b, and the third cross-section 142b have different cross-sectional shapes. In other embodiments, the first cross-section 122b, the second cross-section 132b, and the third cross-section 142b have the same cross-sectional shape. In other embodiments, the first cross-section 122b and the second cross-section 132b have different cross-sectional shapes. In some embodiments, the first cross-section 122b and the second cross-section 132b have the same shape while the third cross-section 142b has a different shape from that of the first and the second cross-sections 122b, 132b.

The elongated members 110b can have a length 150b defined between the first end 120b and the second end 130b. Varying the lengths 150b can result in different elastic properties and compressive responses of the elongated members 110b. For example, the elongated members 110b having a length of 4-6 inches can be less flexible and less able to generate and maintain larger air gaps than the elongated members 110b having a length larger than about 6 inches or greater. In some embodiments, the comfort device 100 comprises elongated members 110b having different lengths 150b.

In some embodiments, the length 150 of the elongated member 110b is between about 6 inches and 14 inches, between about 10 inches and 14 inches, between about 8 inches and 12 inches, between about 5 inches and 10 inches, or about 7 inches, 8 inches, 9 inches, 10 inches, 11 inches, 12 inches, 13 inches, 14 inches, or ranges including two of the aforementioned values. In some embodiments, the length 150 of the elongated members 110 can be at least 6 inches. In other embodiments, the length 150 of the elongated members 110 can be at least 8 inches.

The length 150b of the elongated members 110b can be at least 15 times any of the widths 124b, 134b, 144b or depths 126b, 136b, 146b of the elongated members 110b. In some embodiments, the length 150b of the elongated members 110b is at least 20 times the width or depth of the elongated members 110b. Some embodiments of the elongated members 110b can include circular cross-sections. In such cases, the length 150b of the elongated members 110b can be at least 20 times the diameter of the elongated members 110b.

The first, second, and third cross-sections 122b, 132b, 142b of the elongated members 110b are associated with cross-sectional areas 128b, 138b, 148b, which can be between about 0.0625 in.$^2$ and 0.25 in.$^2$, between about 0.09 in.$^2$ and 0.5625 in.$^2$, between about 0.25 in.$^2$ and 0.445 in.$^2$, between about 0.4 in.$^2$ and 1 in.$^2$, or about 0.0625 in.$^2$, 0.09 in.$^2$, 0.25 in.$^2$, 0.4 in.$^2$, 0.445 in.$^2$, 0.5625 in.$^2$, 1 in.$^2$, or ranges including any two of the aforementioned values. In some embodiments, the elongated members 110b have cross-sectional area of at least one-sixteenth of a square inch. The elongated members 110b of the comfort device 100 can undergo various types and levels of tensile, compressive, shearing stress and/or bending moment during regular use of the comfort device 100. The cross-sectional areas 128b, 138b, 148b and the material properties of the elongated members 110b can affect the ability of the elongated members 110b to better withstand the tensile, compressive, shearing stresses, and bending moments resulting from the regular uses of the comfort device 100.

Figure 8:
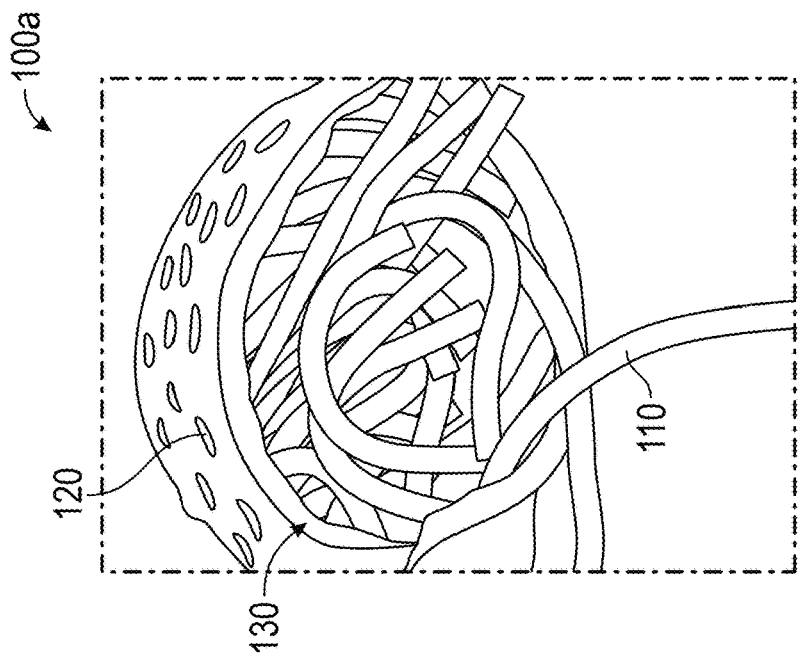
FIG. 8 is another perspective view of an embodiment of a pillow having a plurality of elongate pillow inserts, showing additional detail of interaction between the elongate pillow inserts.
Figure 9:
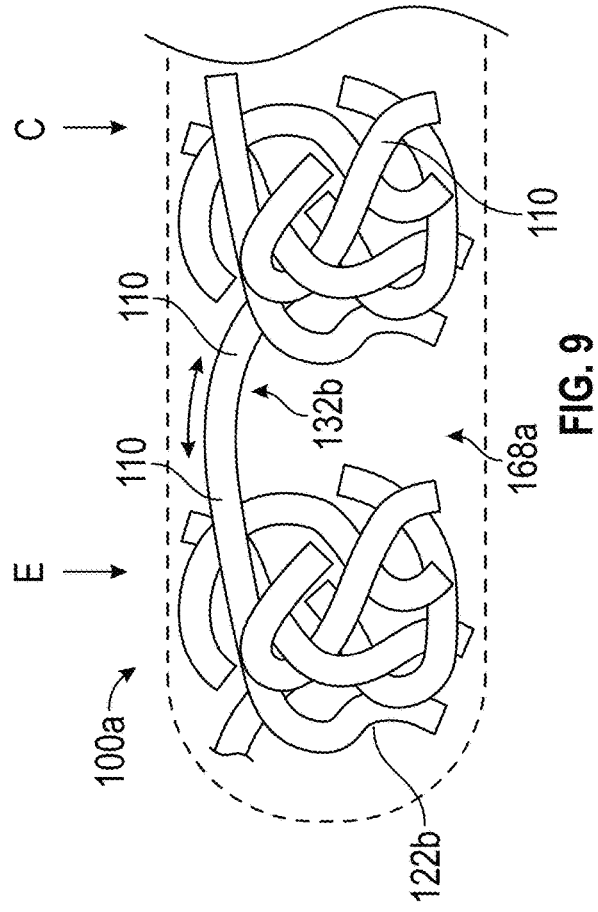
FIG. 9 is a schematic side elevational and partial cutaway view of an embodiment of a pillow, in a relaxed state and illustrating entangled groups of elongated members, one group being near a center of the cushion and another group being closer to an edge of the cushion.
Figure 10:
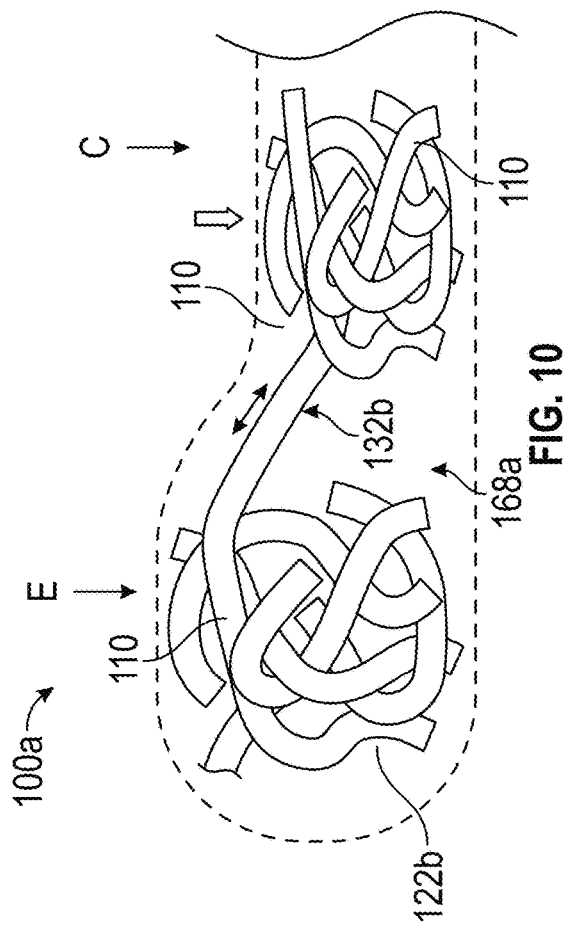
FIG. 10 is a schematic side elevational and partial cutaway view of the cushion of FIG. 9 with the group of elongated members near the center of the cushion being compressed and generating tension in an elongated member extending between the two groups.

With reference to FIGS. 8-10, the elongated members 110b of the comfort device 100 can undergo various types and levels of tensile stress, shearing stress and/or bending moment from regular uses of the comfort device 100. The length 150b and the material properties of the elongated members 110b can affect the ability of the elongated members 110b to withstand shearing stress, bending moments, and/or torque resulting from the regular uses of the comfort device 100. Furthermore, the length 150b of the elongated members 110b can also affect the elastic properties and/or compressive responses of a pillow filled with the elongated members 110b. For example, greater lengths 150b of the elongated members 110b can result in better compressive responses of the comfort device 100a.

FIG. 8 illustrates the embodiment of the comfort device 100a of FIG. 4A, showing additional details of the elongated members 110a. The elongated members 110a, as shown in FIG. 8, can interact with one another and the cover 160a to provide beneficial or desirable effects. Some such effects are associated with longer elongated members.

In some embodiments, the elongated members 110b have a density, which can be between about 0.5 pound per cubic feet (pcf) and 5 pcf, between about 1.5 pcf and 3.5 pcf, between about 2.0 pcf and 3.0 pcf, or about 0.5 pcf, 1.0 pcf, 1.5 pcf, 2.0 pcf, 2.5 pcf, 3.0 pcf, 3.5 pcf, 4.0 pcf, 4.5 pcf, 5.0 pcf, or ranges including any two of the aforementioned values. The elongated members 110b of the comfort device 100 can provide varying levels of comfort and support for the users depending on the density of the elongated members 110b. The elongated members 110b can have different compressive responses and/or elastic properties depending on the density of the elongated members 110b.

In some embodiments, the volumetric ratio between total volume of the elongated members 110b in an uncompressed state and the total volume of the comfort device 100 is between about 0.5 and 0.95, between about 0.6 and 0.8, between about 0.7 and 0.75, or about 0.5, 0.55, 0.6, 0.65, 0.7, 0.75, 0.8, 0.85, 0.9, 0.95, or ranges including any two of the aforementioned values.

As described above, when the elongated members 110b are inserted into the cover 160, the elongated members 110b can be disposed in random orientations, bent and/or looped around themselves and/or one another, resembling entangled strands of spaghetti. Thus, normally, when the elongated members 110b are inserted into a cover 160, they are not arranged into a tight, compact configuration extending parallel to one another. Rather, the random, entangled orientation results in a significant amount of gaps and air spaces between the elongated members 110b. Such air gaps and spaces improve breathability of the comfort device 100. Additionally, an aspect of at least one of the inventions disclosed herein includes the realization that longer members 110 improve the formation and maintenance of such gaps and spaces. For example, shorter members such as about 6 inches and shorter create a lesser amounts of gaps and spaces. However, members of about 6 inches in length and longer, can form more arcuate bends and fuller loops, thereby creating significantly more gaps and spaces inside the cover 160 of the comfort device 100.

Varying the volumetric ratio can also result in different levels of comfort and support for the users. For example, smaller volumetric ratios can provide less support for the users. On the other hand, greater volumetric ratios can provide more support for the users. In some embodiments, the volumetric ratio between 0.75 and 0.9 can provide the optimal level of support and comfort for particular users depending on their personal references.

As shown in FIGS. 9 and 10, the ends of an elongated member 110b can be entangled with other elongated members 110b inside a comfort device 100b. For purposes of describing one possible mode of tensile loading of an elongated member 110b, FIGS. F and 10 show in isolation, the ends of one elongated member 110b can be entangled with other inserts in two different areas of the comfort device 100b, one end entangled in an area toward the center C of the comfort device 100b and the other end entangled in an area closer to an edge E of the comfort device 100b.

Applying this hypothetical orientation, during use, when a load is applied to an upper surface of the central area C of the cushion, the elongated members and the portions thereof located in the central area are compressed downwardly, in the direction of the arrow. As such, and one end of the isolated elongated member 110b is pulled downwardly as the central area C is depressed. However, the second end being entangled with the uncompressed portion of the comfort device 100 near the edge E, remains relatively more stationary. As such the elongated member 110b can be loaded in tension because one end is pulled away from the other. This tensile loading of the elongated member 110b can create a different response of the comfort device to loading during use, like a trampoline which is a different loading dynamic than foam loaded solely in compression. Significantly, such tensile loading is different from the loading mechanisms normally subjected to small, randomly sized fill material, such as that illustrated in FIGS. 1 and 2, e.g., compression only.

As noted above, the comfort device 100 with pieces of resilient material having a length of more than about 6 inches can result in an improved comfort device 100, and more significantly with elongated members 110 that are 8 inches or longer. For example, the comfort device 100 can be filled with elongate pieces of resilient material having a length larger than roughly 6 inches, disposed in random orientations, in which the elongate pieces of resilient material (e.g., elongated member 110a) can be entangled with each other. In such configuration, some elongate pieces of resilient material can have first ends entangled with elongate pieces located at a periphery of the comfort device 100 and second ends entangled with elongate pieces located near the center of the comfort device 100. This is just one illustrative example of an orientation that can result in the tensile loading of an elongated member 110. However, as noted above, the elongated members 110 would be randomly oriented within the comfort device 100. The collective loading of such longer elongated members 110 results in more tensile loading of the elongated members 110 compared to the loading of shorter elongated members 110. Thus, generally speaking, longer elongated members 110 can be loaded both in compression and more in tension while shorter elongated members 110 tend to be loaded more in compression only and less in tension.

Thus, when a load is applied near the center portion of the comfort device 100, the elongate pieces located near the center are pushed downward, causing the second ends of the elongated pieces to be pulled downward. As such, tension can be created between the relatively stationary first ends and the second ends which are pushed downward, causing the elongate pieces to stretch. This tension and stretch can be similar to the loading of springs at the periphery of a trampoline, and thus can cause a reactionary stretching/loading of the elongated pieces in the personal cushion device 100. Such tensile loading of the elongated pieces can result in larger elastic elongations than possible under compression loading resulting from small particulate fill compositions. As such, in some embodiments, a different and desirable cushioning performance can be achieved compared to cushions filled with smaller, shorter and/or more randomly sized pieces.

More specifically, when a force is applied to the elongated member 110b in a first direction, a first end of the elongated member 110b can be moved in the first direction while a second end of the elongated members 110b can remain substantially stationary. The second end, in some embodiments, is tangled within a complex macrostructure of the inserts 100b and thus does not move, or moves vary slightly, when the force is applied. In such configuration, the first end of the elongated member 110b can be stretched away from the fixed end, creating a tension between the first end and the second end of the elongated member 110b. This tension can create a resilient, trampoline-like effect.

The magnitude of the tension force can be proportional and/or associated to one or more properties including, but not limited to, material of the elongated member 110b, lengths of the elongated members 110b, cross-sectional areas of the elongated members 110b, the magnitude of the force, volumetric ratio between the total volume of the elongated members 110b and the total volume of the comfort device 100b, the weight ratio between the total weight of the elongated members 110b and the total weight of the comfort device 100b, the average amount of air space and/or volume between the elongated members 110b, the length of the free end, the length of the fixed end, or the amount of force generated via friction between the elongated members 110b.

It can be advantageous for the elongated members 110 to have smaller or limited cross-sectional areas as such a configuration can provides a more uniform "feel" to the user of the comfort device. For example, smaller cross sectional shapes of the elongate members can result in a smoother, less lumpy feel or appearance of the comfort device 100. However, the tensile loading of longer elongated members 110b in addition to the compression loading, results in higher stresses on the elongated members 110b. Thus, in some embodiments, limiting the cross sectional area to a range can provide optional benefits of balancing the improved durability resulting from larger cross-sections with the smoother appearances and feeling that can result from smaller cross-sections. For example, the minimum cross-sectional area of the elongate foam elongated members 110 can be a predetermined number, for example, of about $1/16^{th}$ of an inch or greater. Where the elongated members 110b are made from open cell foam, a minimum cross-sectional area of about $1/16$ of an inch for elongated members 110b having a length of more than about six inches has resulted in improved reduction in tearing and thus better durability. A significant additional improvement results from using elongated members 110 having a minimum cross-sectional area of about $1/4$ of 1 inch, and significantly where the length of the elongated members 110 is about eight inches or more. The longer elongated members 110 are loaded in tension to even a greater extent, and thus, the larger minimum cross-sectional area associated with longer elongated members 100 can provide significantly improved resistance to tearing and greater durability.

In some embodiments, the minimum cross-sectional area is calculated using at least one of the following variables including, but not limited to, length of the elongated members 110, material of the elongated members 110, the cell-structure of the elongated members 110, the largest dimension of cross-sections of the elongated members 110, and the volumetric ratio between the elongated members 110 of the comfort device 100.

As noted above, having a minimum cross-sectional area of at least $1/16$, $1/8$ or $1/4$ of an inch can improve the performance and durability of the elongated members 110. Additionally, limiting the cross-sectional area of the elongated members 110 can provide a less lumpy and smoother appearance for the associated comfort device 100. Thus, in some embodiments, the elongated members have a cross-sectional area of no more than one square inch, $3/4$ of an inch, $1/2$ an inch, $3/8$ of an inch, or $1/4$ of an inch.

As noted above, in some embodiments, the elongated members 110b can be made from open cell foams as opposed to closed cell foams. Open cell foams are filled with air and have tiny cells that are not completely closed. On the other hand, closed cell foams have cells that are completely closed. The structural difference between open cell foams and closed cell foams lead to different level of durability and elasticity. While open foam cells are more elastic than closed cell foams, they are less durable. Thus, it can be beneficial to have, for some embodiments, a minimum cross-sectional area—as listed above—for elongate foam elongated members 110b made from open cell foams in order to reduce structural degradation and/or dusting from repeated uses.

Figure 11:
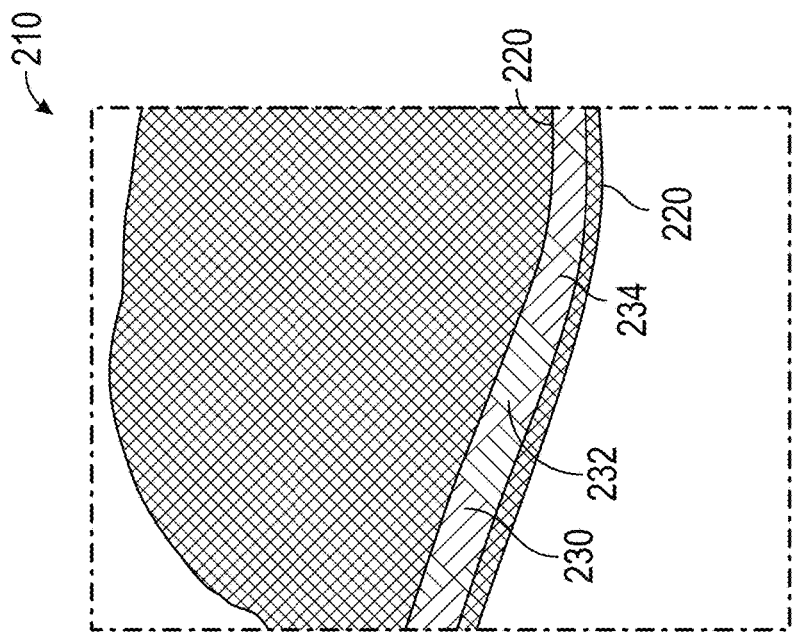
FIG. 11 is a perspective view of a sheet material that can be used for forming different embodiments of elongate members that can be used for filling other embodiments of cushions.

FIG. 11 is a schematic illustration of a material that can be used to form a variation of elongated inserts for the comfort device 100. As shown in FIG. 11, the insert material 210 can include outer surfaces 220 and an inner portion 230. The outer surfaces 220 can comprise one or more openings 222 that allow air to flow through the outer surfaces 220 and the inner portion 230. In some embodiments, the openings 222 are in same size. In other embodiments, the openings 222 vary in size.

The inner portion 230, e.g., the area between the outer surfaces 230 can include a webbing 232 that can comprise a complex structure made out of one or more fibers 234. The fibers 234 can be made out of various durable, yet flexible materials. In some embodiments, the fibers 234 can comprise a first end and a second end, the first end attached to a first outer surface 220, the second end attached to a second outer surface 220. In some embodiments, the fibers 234 generally define a vertical axis between the outer surfaces 220. In some embodiments, the fibers 234 are substantially vertical with respect to the outer surfaces 220. In some embodiments, the fibers 234 are disposed at an angle such that one end of the fibers 234 are at an obtuse angle with respect to the outer surface 230 and another end of the fibers 234 are at an acute angle with respect to the outer surface 230.

Figure 13A:
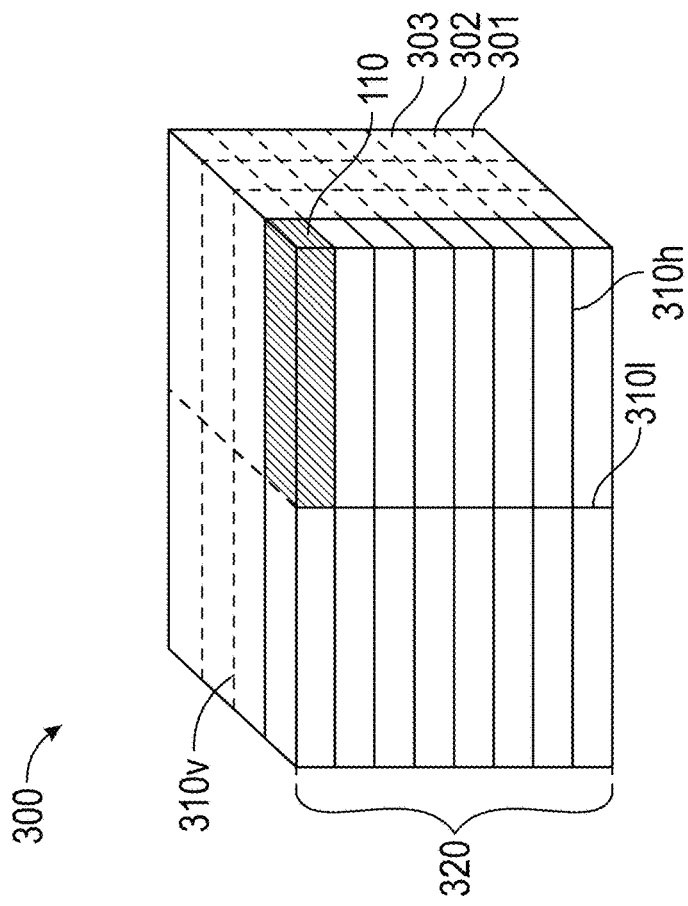
FIG. 13A is a perspective view of the block of virgin resilient material of FIG. 12, showing additional details of a sub-portion of the block of virgin resilient material.
Figure 12:
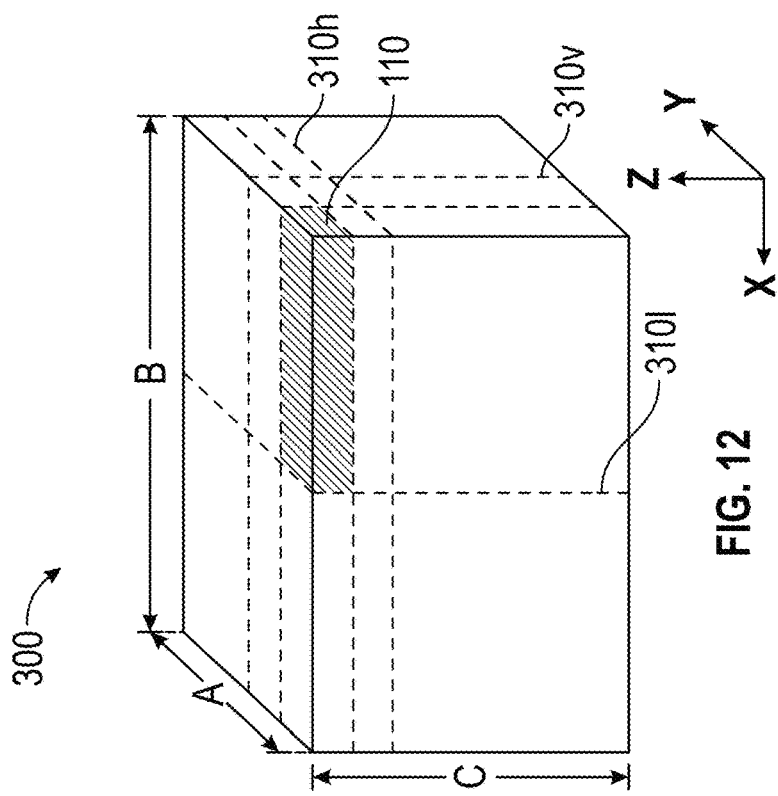
FIG. 12 is a perspective view of a block of virgin resilient material with optional cut lines for cutting the block into groups of elongate members for filling cushions.
Figure 13B:
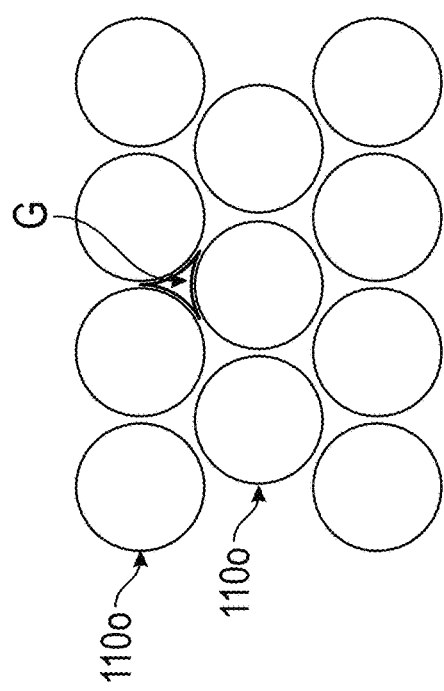
FIG. 13B is a schematic end view of a group of elongated members with circular cross-sections, stacked together with star shaped gaps therebetween.
Figure 13C:
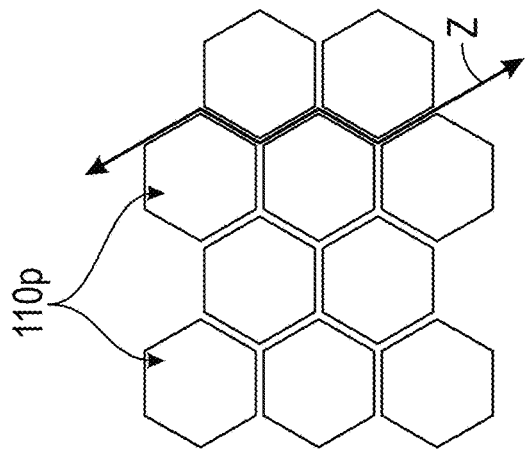
FIG. 13C is a schematic end view of a group of elongated members with hexagonal cross-sections, stacked together.
Figure 13D:
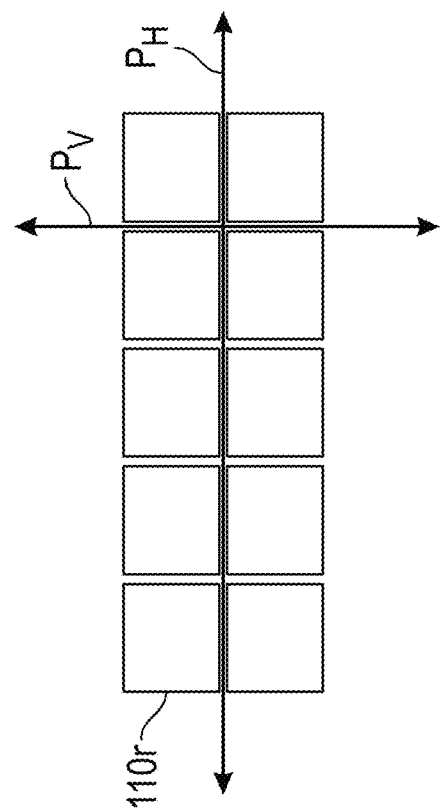
FIG. 13D is a schematic end view of a group of elongated members with rectangular cross-sections, stacked together.
Figure 13E:
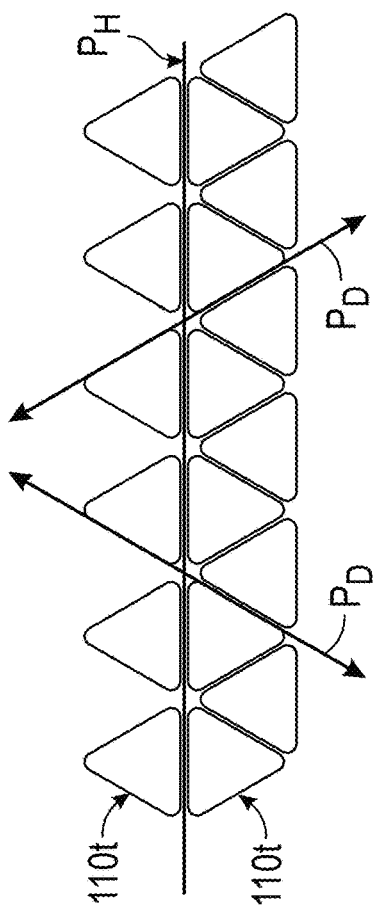
FIG. 13E is a schematic end view of a group of elongated members with triangular cross-sections, stacked together.
Figure 14:
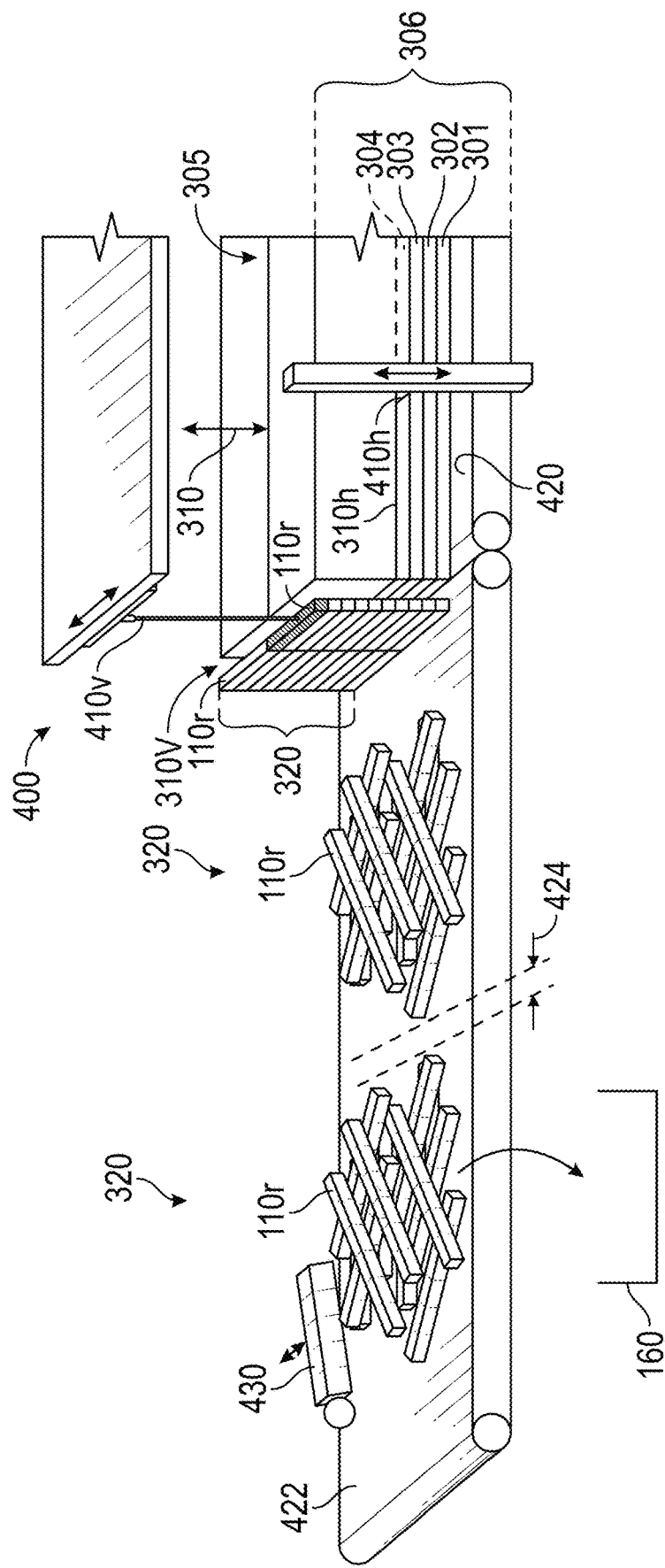
FIG. 14 is a perspective view of a cutting machine having a conveyor belt, illustrating an optional procedure for cutting a block of virgin resilient material into groups of elongate members for filling a cushion.

FIGS. 12-14 illustrate steps of embodiments of methods of manufacturing elongated members 110 from a block 300 of virgin foam. As used herein, the term "virgin" refers to a bulk form of foam that has been formed in a large piece, and which has not been previously cut apart into small pieces and put back together, for example, with adhesive.

The block 300 can be made out of various materials including, but not limited to, polyurethane foam, memory foam, gel foam, latex rubber foam, convoluted phone, evlon foam, reflex foam, high density foam, high resilience phone, Supreem™ foam, rebond foam, closed cell foam, or dry fast foam. The block 300 can be in different shapes. In some embodiments, as shown in FIG. 12, the block 300 can be a cubic or a large roll having side quadrilateral faces. Some forms of bulk foam blocks can be as large as a truck or a school bus. In any of these forms, the block 300 can be considered "virgin" material or foam, as used herein.

For purposes of this description, the block 300 can be considered as having length, denoted as A in FIG. 12, which can be at least about 10 inches with some block being as long as 200 inches or as much as 100 feet (commercially available in a compressed roll). In some embodiments, the length of the block 300 is a whole-number multiple of a dimension of the elongated members 110 such that there will be no scrap segments of the block 300 after all cuts are made. For example, the length A of the block 300 may be 20 times as long as the length 150$b$, width 124$b$ or depth 126$b$ (FIG. 6) of the elongated members 110$b$ to be manufactured.

The block 300 can also be considered as having a width, denoted as B in FIG. 12, which can be between about 10 inches and 200 inches. In some embodiments, the width B of the block 300 can be a multiple of a dimension of the elongated members 110 such that there will be no scrap segments of the block 300 after cuts 310 are made. For example, the width B of the block 300 may be 20 times as long as the length 150$b$, width 124$b$ or depth 126$b$ (FIG. 6) of the elongated members 110.

The block 300 can also be considered as having a height, denoted as C in FIG. 12, which can be between up to about 200 inches, or other sizes. In some embodiments, the height of the block 300 is a multiple of a dimension of the elongated members 110 such that there will be no scrap segments of the block 300 after cuts 310 are made. For example, the height C of the block 300 may be 20 times as long as the length 150$b$, width 124$b$ or depth 126$b$ (FIG. 6) of the elongated members 110.

In some embodiments, an initial step can include cutting a bulk block 300 down to a desired width B, height C and/or length A so that those dimensions are whole-number-multiples of the length 150$b$, width 124$b$ or depth 126$b$ (FIG. 6) of the elongated members 110 that are planned for manufacturing from the block 300. In some circumstances, due to practical limitations of the device used to cut the elongated members 110 from the block 300, there may be pieces of the block 300 left over which cannot be cut using the same technique or device.

For example, described in greater detail below is a foam cutting machine having both vertical and horizontal saw blades and two conveyor belts, all of which are digitally controlled for precise movements. However, some such machines cannot practically or accurately cut small pieces of material.

FIG. 12 is a schematic perspective view of a block of foam 300 with an initial layout of some of the cuts that can be made to the block 300 for forming a plurality of elongated members 110. Cuts 310 can be made using various types of mechanisms including, but not limited to, laser, cable law, circular saw, or pressurized water. In some embodiments, cuts 310 are made for each individual elongated member 110. In other embodiments, cuts 310 are made in a way such that more than one elongated members 110 can be formed in batches.

In some embodiments, cuts 310 can be vertical or horizontal. For example, horizontal cuts 310$h$ are made to have a cutting plane substantially parallel to the x-y axis. In addition, vertical cuts 310$v$ can be made to have a cutting plane substantially parallel to the x-z axis. Furthermore, longitudinal cuts 310$l$ can be made to have a cutting plane substantially parallel to the y-z axis.

In some embodiments, horizontal cuts 310$h$ can be made to cut the block 300 into horizontal sheets 301, 302, 303, 304 having flat surfaces parallel to the x-y axis. Likewise, longitudinal cuts 310$l$ can be used to split the sheets into two or more parallel sheets. Moreover, vertical cuts 310$v$ can be used to cut a plurality of fully formed elongated members 110 from the block 300, for example, in one pass.

In some embodiments, the cuts 310 are linear. In other embodiments, the cuts 310 are not linear. For example, the cuts 310 may comprise one or more arcuate, stepped, and/or discontinuous cutting planes. Cuts 310 can be made to the block 300 to manufacture elongated members 110 with different cross-sections. For example, as described above, cuts 310 with cutting planes parallel to the x-y axis, x-z axis, and the y-z axis can manufacture elongated members 110 that are substantially cuboid with six quadrilateral faces. On the other hand, cuts 310 made while maintaining a fixed distance away from an axis parallel to either of the x-axis, y-axis, or the z-axis can manufacture elongated members 110 that are cylindrical in shape.

FIG. 13A illustrates the layout of a series of horizontal, longitudinal and vertical cut lines showing with the cut 310$h$, 310$l$, and 310$v$ would be made to cut fully formed elongated members 110$b$ from the block 300 without any leftover pieces. Although not illustrated, in use, there may be scrap left over after the final cut, for example, when the last remaining piece of the block 300 falls over or is otherwise too small to be cut by the machine 400. Such a sequence of cutting can provide significant other optional benefits. For example, an aspect of at least one of the inventions disclosed herein includes the realization that elongate members with sides that are alignable into continuous planes can be cut with more efficiency than elongate members that have more complex shapes.

For example, FIGS. 13B and 13C are schematic end views of stacked elongate members 110$o$ (having a round cross section) and 110$p$ (having a pentagonal cross section). In both figures, the elongated members 110$o$, 110$p$ are stacked together as tightly as possible. However, the sides of the elongated members 110$o$, 110$p$ are not alignable into continuous planes. Rather, the sides of the members 110$o$ only make contact tangentially, leaving star shaped gaps G therebetween. The pentagonal members 110$p$, on the other hand, touch along flat sides, but the sides are not alignable into continuous planes. Rather, the sides of the members 100$p$ fall along a zig-zag path Z.

Cutting either of these types of members 110o, 110p is more difficult as such would require drilling, punching, or chopping. Such techniques become more difficult with longer elongated members and especially with smaller cross sections. In other words, long and skinny foam pieces are more difficult to manufacture with drilling, punching, or chopping techniques especially where it is desired to provide a controlled or uniform cross sectional shape along the length thereof. For example, during chopping or punching, soft, foam material can collapse and/or buckle which makes it more difficult to punch or chop long and skinny elongate members with accuracy. Drilling or boring is also difficult as soft, foam material similarly collapses and can be more likely to twist, tear and/or fail when forming long and skinny elongate members.

By contrast, elongated members having sides that are alignable into continuous planes can be manufactured with greater ease, accuracy, and efficiency. For example, FIGS. 13D and 13E are schematic illustrations of end views of stacked rectangular elongate members 110r, and triangular elongate members 110t. As shown in these figures, the sides of the elongate members 110r, 110p, when stacked, are alignable along continuous flat planes PH, Pv, PD. As such, cutting tools can be passed through virgin block material along planar flat planar orientations to cut the elongate members 110r, 100t. The same would be true for elongate members having other cross-sectional shapes, such as diamond, square, and parallelogram (not illustrated).

FIG. 14 is a schematic illustration of a system for cutting machine 400 for cutting a block 300 of virgin foam into elongate members. As shown in FIG. 14, cuts 310h, 310l, 310v can be made to manufacture one or more elongated members 110r, for example, in some embodiments, in batches 320. The batches 320 can be dimensioned so as to include a sufficient number of the elongated members 110 for making one or a fraction of one (½, ¼, etc.) individual comfort device 100. In some embodiments, the batches 320 comprise a single vertical cut 310V of the block 300. In some embodiments, horizontal 310h and longitudinal 310l cuts have been made prior to the vertical cut 310v. Thus, at the end of making the vertical cur 310v, the batch 320 is comprised of fully formed elongated members 110r. Depending on the size of the elongated members 110, the size of the batches 320 can vary. Bigger elongated members 110 can require bigger batches 320. On the other hand, smaller elongated members 110 can require smaller batches 320. Use of the batches 320 during manufacturing process of the elongated members 110 can decrease manufacturing time, increase efficiency, and improved control for manufacturing comfort devices 100. The manufacturing process of the elongated members 110 is further described below.

FIG. 14 is a schematic, perspective view of a type of commercially available foam block cutting machine 400 which can be used to cut foam for making elongate members 110 disclosed herein. The machine 400 can include a conveyor belt system having an intake side conveyor 420 and an output side conveyor 422. The machine 400 also includes a horizontal cutter 410h and a vertical cutter 410v. The cutters 410h, 410v can comprise different types of cutting devices including, but not limited to, saw, tensioned blade saw, band saw, oscillating saw, hot wires, or lasers. The machine includes a programmable digital controller (not shown) that controls the vertical height and longitudinal position of the cutter 410h, the lateral position of the vertical cutter 410v, and the movements of the input and output conveyors 420, 422, all of which are independently controllable. Because this type of cutting device, is commercially available, the details of its construction and operation are not provided herein.

In use, the block 300 is placed on the input conveyor belt 420 of the machine 400. In some embodiments, vertical position of the cutter 410h is disposed at a first position above the surface of the conveyors 420, 422, the cutter 410h is activated, and the conveyors 420, 422 move the block 300 into the cutter 410h so as to make a first horizontal cut through the bock 300 to create a first sheet 301 at the bottom of the block 300. The height of the cutter 410h can then be changed to a second position and the process can be repeated to cut additional sheets 302, 303, 304 until the block 300 is cut in to the desired number of sheets. Each sheet 301, 302, 303, 304 can have a thickness corresponding of a dimension of the desired elongated member 110r, such as a width 123b or depth 126b (FIG. 6).

The machine 400 can also be used to split the block 300 into longitudinal logs. For example, the machine 400 can adjust the position of the vertical cutter 410v to make the longitudinal cut 310l, then drive the conveyors 420, 422 to move the block 300 (or stacked sheets 301, 302, 303, 304) against the vertical cuter 410v so as to cut the sheets into left and right logs 306, 305.

After splitting the stacked sheets 301, 302, 303, 304 into left and right logs 306, 305, the machine can then move the vertical cutter 410v across the logs to make the vertical cut 310v and thereby simultaneously make the final cut 310v needed to fully form the elongated members 110r and separate batches 320 of the elongated members 110r from the logs 306, 305. As each batch 320 is separated from the logs 306, 305, the batched can fall over into a pile of elongated members 110r.

In some embodiments, the output conveyor 422 can be driven to first move a batch 320 away from the logs 306, 305, then bump the conveyor back toward the logs 306, 305, to thereby induce the toppling of the batch 320 away from the logs 306, 305 into a discrete pile of elongated members 110r. Additionally, the conveyor 422 can be driven to move a batch 320 of elongated members 110r away from the logs 306, 305 before the next batch 320 of elongated members 110r is cut from the logs 306, 305.

Optionally, the conveyor 422 can be driven to move one batch 320 sufficiently far from the logs 306, 305 such that when a subsequent batch 320 is cut from the logs 306, 305, it falls in a manner such that it remains spaced from the previous batch 320, for example, by a predetermined minimum spacing 424. The spacing 424 can be any desired size. In some embodiments, the size of the spacing 424 can be at least about ½ inch, the width of a human hand, a length providing clearance for a pusher device (described below) or any other size. As such, the batches 320 are cut from the logs 306, 305 and maintained in a spaced relationship from each other. This can provide an additional optional benefit in that it is easier to pick up or sweep one more discrete batches 320 off of the conveyor 422 and into a cover 160 for manufacturing a comfort device 100 with improved efficiency.

The machine 400 can also include one or more pusher devices 430. The pushers 430 can be configured to push batches 320 of the elongated members 110 off of the conveyor 422. For example, in some embodiments, the pushers 430 can be configured to push the batches 320 towards staging/packing areas for comfort devices 100 in which batches 320 are inserted into a cover 160 of a comfort device 100 by a human or another machine (not illustrated).

As noted above, in some embodiments, each batch 320 can include a number of elongated members 110 sufficient to fill a single comfort device 100. Optionally, the batches are sized such that a whole number (e.g., 1, 2, 3, 4 . . . ) of batches 320 are sufficient for completely filling a single comfort device 100. For example, each batch 320 can include a number of elongated members 110 such that a single batch 320 or a whole number of batches 320 is enough to fill a single beanbag. In another example, each batch 320 can include a number of elongated members 110 sufficient to fill a single pillow case. In some embodiments, a batch 320 is made first and the elongate inserts 110 are cut from the batch. In other embodiments, cuts are made to the block first and each batches are then separated from other batches.

Optionally, a block of cushion material 300 can include more than one material. For example, the layers 301, 302, 303, and 304 can be made from different material compositions, or the same or similar material compositions but with different dimensions and/or specifications, such as different sizes, densities, weights, textures, load deflection rating, or other characteristic or specification. Such different material compositions can include, for example, but without limitation, polyurethane foam, memory foam, gel foam, latex rubber foam, convoluted phone, evlon foam, reflex foam, high density foam, high resilience phone, Supreem™ foam, rebond foam, closed cell foam, or dry fast foam or other foams or cushion materials. As used here, the phrase "different material" is intended to mean either a) different compositions, as memory foam is different from latex, and b) different material characteristics, such as different dimensions (thickness, depth), different densities, different weights, etc. [are there other different characteristics of cushion materials, measure of elasticity perhaps?] The layers 301, 302, 303, 304 are described below as being oriented horizontally, stacked atop one another. However, the description below applies equally to layers 301, 302, 303, 304 being oriented vertically, side-by-side, such as the logs 305, 306.

In some embodiments, the desired different materials can be obtained in sheet form or block form and cut into sheets, for example, using a machine such as the machine 400 (FIG. 14). Such sheets can then be stacked, such as in the configuration of the stacked sheets of layers 301, 302, 303, 304 in FIG. 14. Alternatively, a block 300 can comprise side-by-side layers, such as logs 305, 306 made from different materials.

With reference to FIGS. 15-18, the block 300 can comprise different materials in various different orientations and arrangements. FIG. 15 illustrates the block 300 comprise groups of layers 301G, 302G. The first group of layers 301G includes layers 301a, 301b, 301c, 301d. The second group of layers 302G includes layers 302a, 302b, 302c, 302d. In the configuration illustrated in FIG. 15, the groups 301G, 302G are stacked vertically, but in optional embodiments, the layers can be arranged side-by-side.

In the variation shown in FIG. 16, the layers of the first material 301a, 301b, 301c, 301d are interleaved with the layers of the second material 302a, 302b, 302c, 302d. As such, they are stacked, starting from the bottom, in the following order: 301a, 302a, 301b, 302b, 301c, 302c, 301d, 302d. In this configuration, when the block 300 is cut along a vertical cut 310 V, the individual elongate members 301 there which are thereby formed, would be in a group of mixed materials. Further, stacked in the configuration of FIG. 16, the elongate members 301 are at least partially premixed, for example, the elongate members 301 are more randomly mixed then groups of the elongate members 301 cut from the block illustrated in FIG. 15.

Figure 17:
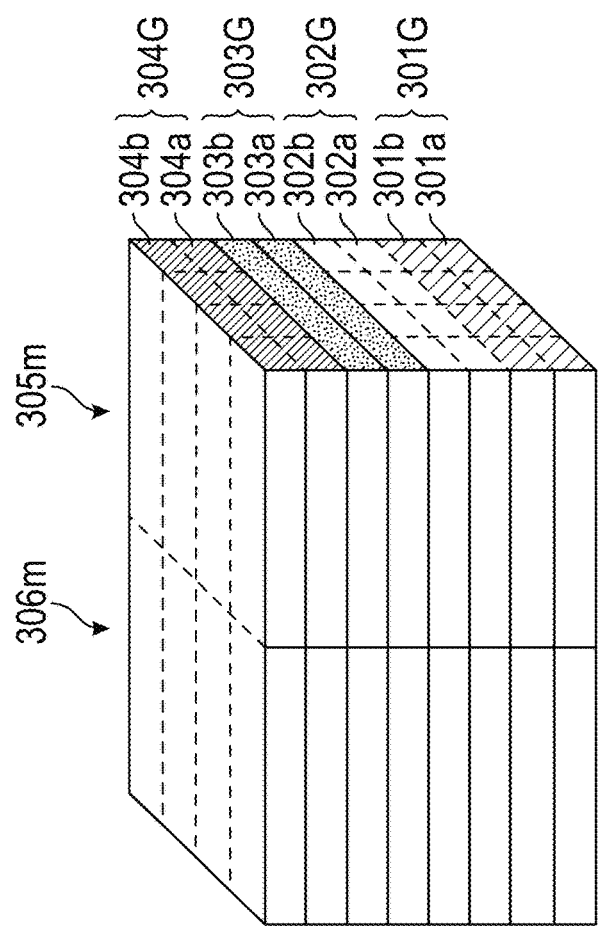
FIG. 17 is a perspective view of a collection of layers of four different virgin resilient materials with optional cut lines for cutting the collection into groups of elongate members for filling cushions.

FIG. 17 illustrates a block 300 having four different materials, forming a plurality of each of layers 301, 302, 303, and 304. More specifically, in the configuration of FIG. 17, the layers are stacked in four groups of different materials, 301G, 302G, 303G, 304G. Group 301G comprises to layers of a first material 301a, 301b. Group 302G comprises two adjacent layers of the second material 302a, 302b. The group 303G comprises two adjacent layers of a third material 303a, 303b. The group 304G comprises two adjacent layers of a fourth material 304a, 304b.

Figure 18:
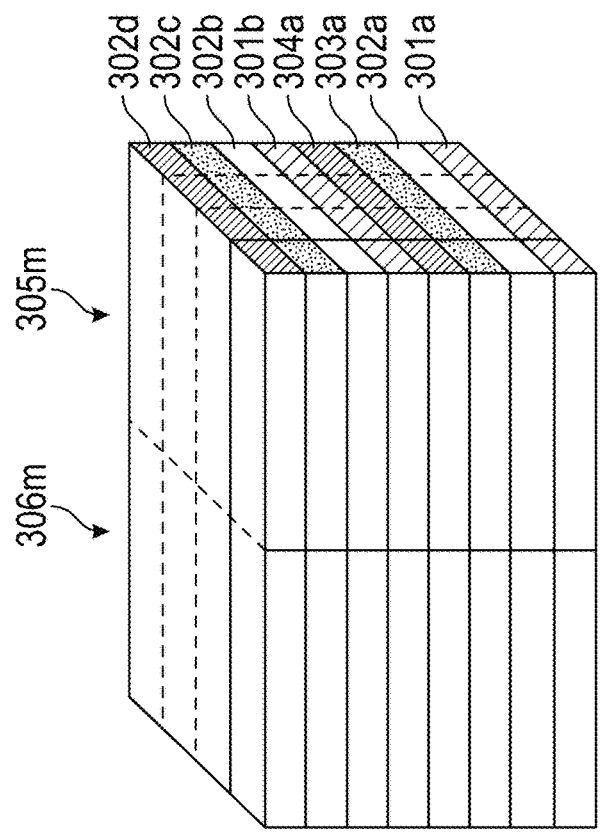
FIG. 18 is a perspective view of the collection illustrated in FIG. 17, with an optional, further interleaved arrangement of the layers.

FIG. 18 illustrates a configuration in which the layers 301ab, 302ab, 303ab, and 304ab are interleaved with each other, thereby providing a manner for pre-mixing the elongated members 301.

Figure 19:
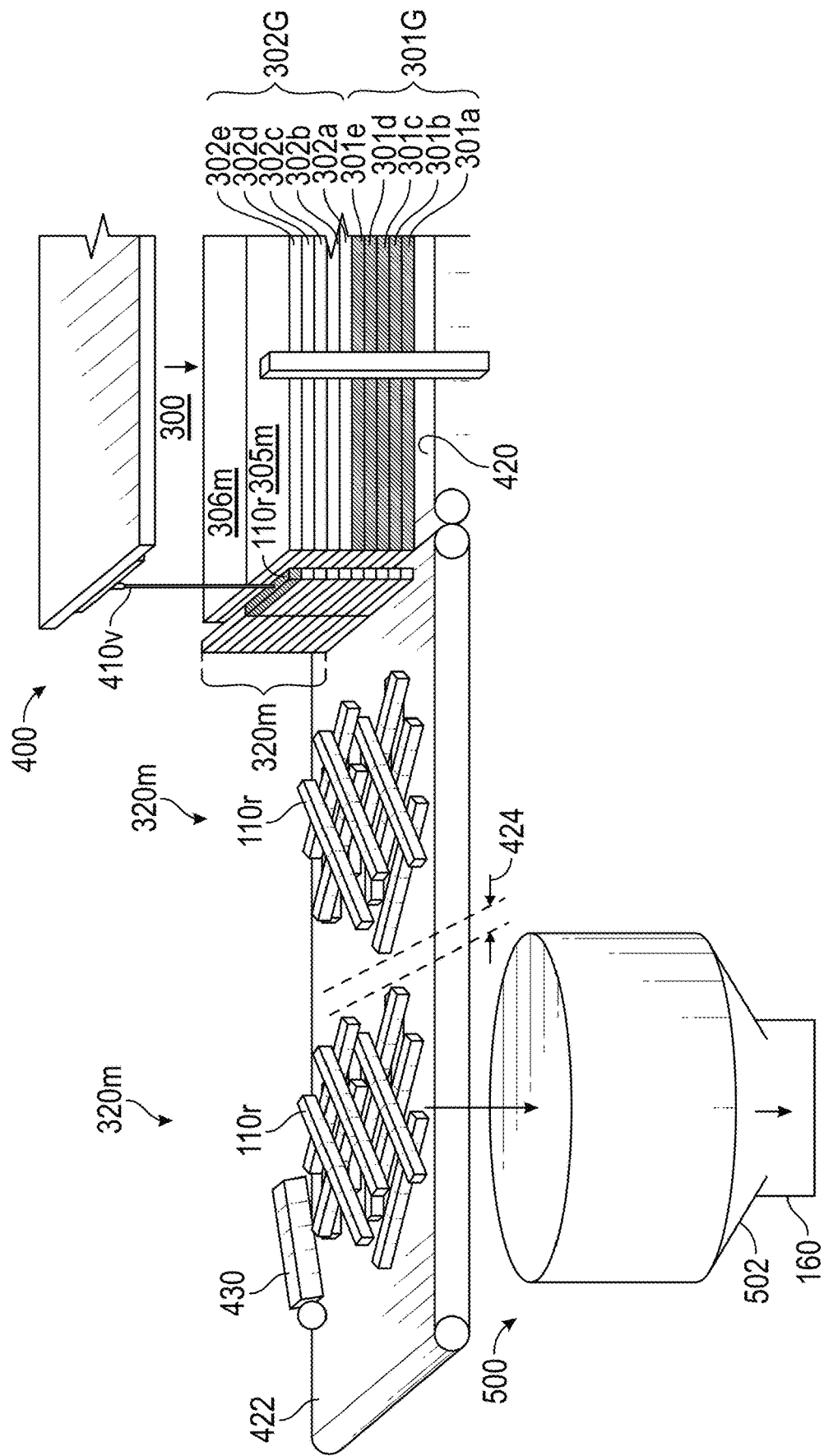
FIG. 19 is a perspective view of a cutting machine having a conveyor belt, illustrating an optional procedure for cutting a block of virgin resilient material into groups of elongate members and mixing the cut groups prior to insertion into a cushion.

In the schematic illustration of the embodiment of FIG. 19, which is a modification of the embodiment of FIG. 14, the block of material 300 includes a first group of layers of material 301G having five layers 301a-301e, and the second group of layers 302G includes five layers 302a-302e.

In operation, similarly to that described above with reference to FIG. 14, as a batch 320m comprised of elongated members 110r made from different materials, is cut from the block 300, it falls over into tumbled batches 320m onto the conveyor 422. By including different materials in multiple layers in the block 300, the tumbled batches 320m are partially pre-mixed. Optionally, in some embodiments, the batches 320m can be moved from the conveyor 422 into a mixer 500, which can be in the form of any of a variety of widely commercially available drum mixers.

The drum mixer 500 can be configured to spin and tumble one or more batches 320m. In some embodiments, the mixer 500 is sized to receive, mix, and discharge one or a number of batches 320m sufficient to fill a single cushion cover 160.

After mixing the one or more batches 320m, the batches 320m can be discharged to a cushion cover 160. In some embodiments, the mixer 500 is mounted for dumping into a funnel 502 leading to a cushion cover 160. Further, in some embodiments, mixer 500 can have a door on a lower portion thereof, allowing mixed batches 320m to be discharged by gravity into a cushion cover 160 disposed below.

In some embodiments, additional filler materials can be inserted into the cover 160 and/or into the mixer 500 for later insertion into a cover 160. For example, but without limitation, materials such as down feathers, loose fiber, ball fiber, wool, shredded foam, shredded latex, or any mix of the above. In some embodiments, the total weight of the additional filler material can be about 5% or more of the total weight of all of the elongated inserts and filler material inserted into the cover 160.

FIG. 20 is a flow chart illustrating a process 500 that can be used for manufacturing any of the elongated members 110, 110a, 110b, 110c, 110d, 110e or any other elongated members disclosed above. At block operation 502, the block of foam 300 is placed on the machine 400. As discussed above, various types of foams may be used for the purpose of the present disclosure.

At operation block 504, the block 300 is cut. Various types of cuts 310 can be made to the block 300. In some embodiments, the cuts 310h having cutting planes parallel to the x-y axis are made. In some embodiments, the cuts 310v having cutting planes parallel to the x-z axis are made. In some embodiments, the cuts 310l having cutting planes parallel to the y-z axis are made. In some embodiments, the cuts 310 have cutting planes that are linear. In other embodiments one or more of the cuts 310 have nonlinear cutting planes. The cuts 310 can be made to manufacture the elongated members 110 having different sizes. The cuts 310 can also be made to manufacture the elongated members 110 having different cross-sections. The cuts 310 can be configured to generate a pile of inserts comprising sufficient number of inserts to fill a single comfort device. In some embodiments, each pile of inserts is an individual batch 320 for a single comfort device.

The cuts 310 can be horizontal cuts. In some embodiments, the cuts 310v are vertical cuts. The cuts 310 can be made vertical to surfaces of the block 300 such that the cuts 310 are transverse to the surfaces. In some embodiments, the cuts 310 are made at an angle with respect to the surfaces of the block 300. The machine 400 can make a series of horizontal cuts 310h and one or more longitudinal cuts 310l to generate one or more columns from the block 300. For example, horizontal cuts 310h can be made to define heights of the elongated members 110 and longitudinal cuts 310l can be made to define length of the elongated members 110. Another set of vertical cuts 310v can be made to define depths of the elongated members 110.

At block 506, after the cuts 310 are made, the elongated members 110 can be collected. The process of collecting the elongated members 110 can be manual or automatic. In some embodiments, a number of elongated members 110 can be collected sufficient to fill up individual comfort device 100.

At block 508, the inserts 110 cut from the block 300 can be organized into separate piles or batches 320. For example, the machine 400 can be configured to output batches 320 of elongated members 110 that comprise a sufficient number of elongated members 110 such that one or a whole number of batches are sufficient to completely fill one comfort device 100. In some embodiments, the organization of elongated members 110 is achieved by controlling the conveyor 422 to accumulate and space apart batches.

In some embodiments, the pusher 430, shown in FIG. 14, is controlled to move elongated members 110 so as to form batches 320. In some embodiments, the pusher 430 can be controlled to push one or more piles of elongated members 110 to different positions on the output conveyor 422 or to different downstream conveyor belts (not shown). The machine 400 can be configured to use the pusher 430 to push certain piles of inserts 110 or batches 320 to one direction and moving other piles of inserts 110 or batches 320 to a different direction. Optionally, the piles can be separated by a predetermined distance 424, allowing the pusher 430 to readily transfer the piles to different output conveyor belts. Separating the piles (or batches 320) from the block 300 by the predetermined distance 424 can also allow the next batch 320 to be cut without any interference and/or comingling. In some embodiments, the predetermined distance 424 is about 1 or more inches. This predetermined distance 424 between the piles can be adjusted.

At block 510, the elongated members 110 can be placed into the compartment 168 within the cover 160 of the comfort device 100. In some embodiments, the elongated members 110 are inserted into the compartment 168 defined by the cover 160 of the comfort device 100. In some embodiments, different types of the elongated members 110 (e.g., size, density, shape, and/or material) are placed in different compartments 168 to provide unique elastic properties and/or compressive responses.

FIG. 21 illustrates a method 530 for manufacturing one or more elongated members 110 from a block of foam material 300. At operation block 532, the block 300 is placed on a conveyor belt of a cutting machine. The block 300 can be made of foam. Various different kinds of foam can be used for the purpose of the present disclosure including, but not limited to, polyurethane foam, memory foam, gel foam, latex rubber foam, convoluted phone, evlon foam, reflex foam, high density foam, high resilience phone, Supreem foam, rebond foam, closed cell foam, or dry fast foam.

At block 534, horizontal cuts 310h along cutting planes parallel to the x-y axes are made. For example, the horizontal cutter 410h can be used to cut the block into a plurality of sheets of foam by driving the conveyors 420, 422 so as to pass the block 300 against the cutter 410h in movements parallel to the x-y plane.

At block 536, one or more longitudinal cuts 310l having cutting planes parallel to z-y axis can be made. For example, the vertical cutter 410v can be used to cut the block 300, which has already been cut into a plurality of sheets, into a plurality of logs of foam by driving the conveyors 420, 422 so as to pass the block 300 against the cutter 410v in movements parallel to the z-y plane.

At block 538, vertical cuts 310v having cutting planes parallel to x-z axis are made. For example, the vertical cutter 410v can be used to cut the block 300, which has already been cut into a plurality of sheets and logs of foam, by driving the cutter 410v laterally through the block 300 in movements parallel to the x-z plane. In some embodiments, only one cut 310v with cutting plane parallel to the x-z axis is made to form a single batch 320 of elongated members 110. In other embodiments, a plurality of vertical cuts 310v with cutting planes parallel to the x-z axis are made for each batch of elongated members 320.

In some embodiments, the longitudinal cuts 310l with cutting planes parallel to the y-z axis can be equidistant from each other. For example, a first cut is made 8 inches away from a first side of the block 300, while a second cut is made 8 inches away from the first cut, where the second cut is further away from the first side of the block 300 and the first cut. In this example the first cut and the second cut can define the 8 inch length of the elongated members 110. In another example, a fourth cut and a fifth cut is made one inch and 2 inches away from a second side of the block 300. In this example the third cut and the fourth cut can define the one inch width or 1 inch height of the elongated members 110. In other embodiments, the cuts 310 are not equidistant from each other.

At block 540, the elongated members 110 manufactured by the cuts 310 described above are collected to be put into individual comfort devices 100.

In some embodiments, the method 530 is used for manufacturing batches of elongate elongated members 110 from a block 300 of foam material. The method 530 can comprise placing the block 300 of foam material onto an input conveyor belt of a cutting machine, where the input conveyor belt of the cutting machine defines an input axis. The method 530 can further comprise transferring the block 300 of foam material along the input conveyor belt to a cutting area of the cutting machine. The method 530 can further comprise cutting the block 300 into a plurality of horizontal layers and at least two columns and generating a first batch from the large block of foam material by making at least a first cut to the horizontal layers. The first cut can be transversal with respect to the horizontal layers of the block 300. The method 530 can further comprise separating the first batch from a first remainder of the large block of foam material and generating a second batch from the first remainder of the large block of foam material by making at least a second cut to the horizontal layers, the second cut being transversal with respect to the horizontal layers. The second batch, just like the first batch, can be separated from a second remainder of the block 300 of foam material.

The method 530 of manufacturing batches of elongate elongated members 110 from a block 300 of foam material can comprise placing the block 300 of foam material onto an input conveyor belt of a cutting machine. The input conveyor belt can define an input axis while the block 300 of foam material can have a width, a height, and a depth. The method 530 can further comprise moving the block 300 of foam material in a first direction along the input conveyor belt, the first direction being parallel to the input axis. The method 530 can also comprise performing one or more first cuts, performing one or more second cuts, and performing a first of one or more third cuts, where the first of one or more third cut generates a first batch of elongate inserts. The first batch of elongate inserts can be separated from a first remainder of the large block of foam material. The method 530 can further comprise performing a second of one or more third cuts to generate a second batch of elongate inserts, where the second batch can be separated from a second remainder of the large block of foam material.

In other embodiments, the one or more first cuts are parallel to a first plane defined by the depth and the width of the large block of foam material. In some embodiments, the one or more second cuts are parallel to a second plane defined by the depth and the height of the large block of foam material, while the one or more third cuts are parallel to a third plant defined by the width and the height of the large block of foam material. The one or more second cuts and the one or more third cuts can be orthogonal to the one or more first cuts.

In some embodiments, a method for efficient, batch manufacturing of pillows filled with a plurality of elongate inserts can be performed by a cutting machine cutting a large block of foam material, cut in batches as described above. The method can include a combination of the following steps: (1) placing the block of foam material onto an input conveyor belt of the cutting machine, the input conveyor belt defining an input axis; (2) transferring the large block of foam material along the input conveyor belt to a cutting area of the cutting machine; (3) cutting the large block of foam material into a plurality of horizontal layers; (4) generating a first batch from the large block of foam material by making at least a first cut to the horizontal layers, the first vertical cut being transverse with respect to the horizontal layers; (5) transferring the first batch to a first output conveyor belt; (6) collecting a first plurality of elongate inserts from the first batch; (7) inserting the first plurality of elongate inserts into a first pillow; (8) generating a second batch from the large block of foam material by making at least a second vertical cut to the horizontal layers, the second vertical cut being transverse with respect to the horizontal layers; (9) transferring the second batch to a second output conveyor belt; (10) collecting a second plurality of elongate inserts from the second batch; and (11) inserting the second plurality of elongate inserts into a second pillow.

In some embodiments, the method for efficient, batch manufacturing of pillows can further include one or more of the following features in any combination: (i) wherein a plurality of horizontal layers have the same height; (ii) wherein the first output conveyor belt and the second output conveyor belt define a first output axis and a second output axis, respectively; (iii) wherein the first output axis and the second output axis are different from the input axis and different from each other; (iv) wherein the first batch and the second batch comprise a number of elongate inserts sufficient to fill at least a predetermined portion of the first pillow and the second pillow, respectively; (v) wherein the predetermined portion is at least 75% of the first pillow and the second pillow; (vi) wherein the location and the number of the first cut are associated with the size and/or volume of the first pillow; (vii) wherein the location and the number of the second cut are associated with the size and/or volume of the second pillow; (viii) wherein a volume of the first batch and a volume of the second batch are the same; and (ix) wherein a volume of the first batch and a volume of the second batch are different.

In other embodiments, the method for efficient, batch manufacturing of pillows can further include transferring the first batch to a first conveyor belt further comprising: (i) moving the first batch and a remainder of the large block of foam material along the input conveyor belt; (ii) transferring the first batch to the first output conveyor belt while the remainder of the large block of foam material remains on the input conveyor belt; and (iii) moving the first batch in a first direction along the first output conveyor belt.

In other embodiments, the method for efficient, batch manufacturing of pillows can further include transferring the second batch to a second conveyor belt further comprising: (i) moving the first batch and a remainder of the large block of foam material along the input conveyor belt; (ii) transferring the first batch to the second output conveyor belt while the remainder of the large block of foam material remains on the input conveyor belt; and (iii) moving the first batch in a second direction along the second output conveyor belt.

In some embodiments, a method for manufacturing batches of elongate inserts from a large block of foam material can include a combination of the following steps: (1) placing the large block of foam material onto an input conveyor belt of a cutting machine, the input conveyor belt defining an input axis; (2) transferring the large block of foam material along the input conveyor belt to a cutting area of the cutting machine; (3) cutting the large block of foam material into a plurality of horizontal layers and at least two columns; (4) generating a first batch from the large block of foam material by making at least a first cut to the horizontal layers, the first cut being transversal with respect to the horizontal layers; (5) separating the first batch from a first remainder of the large block of foam material; (6) generating a second batch from the first remainder of the large block of foam material by making at least a second cut to the horizontal layers, the second cut being transversal with respect to the horizontal layers; and (7) separating the second batch from a second remainder of the large block of foam material.

In some embodiments, a method of manufacturing batches of elongate inserts from a large block of foam material can include a combination of the following steps: (1) placing the large block of foam material onto an input conveyor belt of a cutting machine, the input conveyor belt defining an input axis, the large block of foam material having a width, a height, and a depth; (2) moving the large block of foam material in a first direction along the input conveyor belt, the first direction being parallel to the input axis; (3) performing one or more first cuts; (4) performing one or more second cuts; (5) perform a first of one or more third cuts, the first of one or more third cut generating a first batch of elongate inserts; (6) separating the first batch of elongate inserts from a first remainder of the large block of foam material; (7) performing a second of one or more third cuts, the second of one or more third cut generating a second batch of elongate inserts; and (8) separating the second batch of elongate inserts from a second remainder of the large block of foam material.

In other embodiments, the above method can further include one or more of the following features in any combination: (i) the one or more first cuts being parallel to a first plane defined by the depth and the width of the large block of foam material; (ii) the one or more second cuts being parallel to a second plane defined by the depth and the height of the large block of foam material; (iii) the one or more third cuts being parallel to a third plane defined by the width and the height of the large block of foam material; and (iv) wherein the one or more second cuts and the one or more third cuts are orthogonal to the one or more first cuts.

During regular use of the comfort device 100, the elongated members 110 can move in various ways. The elongated members 110 can move vertically or horizontally during normal use (e.g., comfort device supporting a user's head). In addition, the elongated members 110 can also be twisted and bent. In order for the elongated members 110 to withstand repeated, prolonged uses of the comfort device 100, the elongated members 110, in some embodiments, have certain material properties, compressive responses, and/or elastic properties. Such properties allow the elongated member 110 to withstand the shearing stress, bending moments, and/or torques resulting from repeated, prolonged uses of the comfort device 100, and to retain its initial size, volume, and/or shape. In some embodiments, the dimensions (e.g., length, width, height, and/or cross-sectional area) of the elongated member 110 affect the compressive responses and/or elastic properties. Therefore, varying the dimensions of the elongated member 110 can change the compressive responses and/or elastic properties of the elongated member 110.

Various other modifications, adaptations, and alternative designs are of course possible in light of the above teachings. Therefore, it should be understood at this time that within the scope of the appended claims the invention may be practiced otherwise than as specifically described herein. It is contemplated that various combinations or subcombinations of the specific features and aspects of the embodiments disclosed above may be made and still fall within one or more of the inventions. Further, the disclosure herein of any particular feature, aspect, method, property, characteristic, quality, attribute, element, or the like in connection with an embodiment can be used in all other embodiments set forth herein. Accordingly, it should be understood that various features and aspects of the disclosed embodiments can be combined with or substituted for one another in order to form varying modes of the disclosed inventions. Thus, it is intended that the scope of the present inventions herein disclosed should not be limited by the particular disclosed embodiments described above.

Moreover, while the invention is susceptible to various modifications, and alternative forms, specific examples thereof have been shown in the drawings and are herein described in detail. It should be understood, however, that the invention is not to be limited to the particular forms or methods disclosed, but to the contrary, the invention is to cover all modifications, equivalents, and alternatives falling within the spirit and scope of the various embodiments described and the appended claims. Any methods disclosed herein need not be performed in the order recited. The methods disclosed herein include certain actions taken by a practitioner; however, they can also include any third-party instruction of those actions, either expressly or by implication. For example, actions such as "placing the inserts within the compartment" includes "instructing the placing the inserts within the compartment."

The ranges disclosed herein also encompass any and all overlap, sub-ranges, and combinations thereof. Language such as "up to," "at least," "greater than," "less than," "between," and the like includes the number recited. Numbers preceded by a term such as "approximately", "about", and "substantially" as used herein include the recited numbers (e.g., about 10%=10%), and also represent an amount close to the stated amount that still performs a desired function or achieves a desired result. For example, the terms "approximately", "about", and "substantially" may refer to an amount that is within less than 10% of, within less than 5% of, within less than 1% of, within less than 0.1% of, and within less than 0.01% of the stated amount.

Personal support devices, such as pillows or larger devices such as soft furniture in the shape of chairs tor love seats, sometimes referred to as "bean bag" furniture, provide support and comfort for users by supporting structures of different bodily parts such as head, neck, shoulders, hip, and spine. They can also help in preventing and alleviating different types of back and neck pain, as well as shoulder, hip, and other forms of joint pain. Pillows, for example, can provide support for the head, neck, and shoulders by evenly distributing gravitational forces during sleep.

Some personal cushion devices can be in the form of an outer shell filled with pieces of resilient material. The material properties of the inserts provide the desired support and comfort. Different types of inserts can provide different levels of support and comfort. Different inserts have different compressive responses and/or elastic properties, which results in different levels of support and comfort for users. Inserts incorporating harder materials can have less "give" then inserts incorporating softer materials.

In addition, different levels of support and comfort can be provided by varying characteristics of the manner and/or extent to which a cushion is filled, for example, by varying a total weight and/or volume of the elongate inserts. The total weight and total volume of the elongate inserts can be used to calculate "weight ratio" and "volumetric ratio" of the elongate inserts. The "weight ratio", as used herein, can indicate a ratio between the weight of the elongate inserts and the weight of the pillow with the elongate inserts. The "volumetric ratio", as used herein, can indicate a ratio between the volume occupied by the elongate inserts in a relaxed state and the volume occupied by the pillow with the elongate inserts inside.

Different weight and/or volumetric ratios between the pillow inserts and the pillows can result in different amount of air space between the inserts within the pillow. Increase in weight and/or volumetric ratio between the inserts and the pillows can be achieved by an increase in the number of the inserts in the pillows. Increase in the number of the inserts can result in an increase in volume occupied by the inserts and thus less volume occupied by air within the pillow. However, it is also possible that decrease in weight and/or volumetric ratio between the inserts and the pillows may not necessarily result in decrease in the number of the inserts in the pillows.

Increase in volumetric ratio can provide increased compression response and therefore increased support for the users during use. In some embodiments, increase in weight ratio can also provide increased compression response and therefore increased support for the users during use. Compression response and/or elastic properties of the pillow inserts can also be modified by varying the shapes of pillow inserts. For example, flat rectangular cuboid foam inserts can have different compression response and/or elastic properties than elongated cylindrical foam inserts.

What is claimed is:

1. A method for efficient manufacturing of comfort devices filled with elongate foam inserts formed by a cutting machine and cut from a block of foam material in batches, the method comprising:
positioning a block of foam material onto an input conveyor belt of the cutting machine, the input conveyor belt defining an input axis;
transferring the block of foam material along the input conveyor belt to a cutting area of the cutting machine;
cutting the block of foam material to generate a first batch of elongate foam inserts, the step of cutting the block of foam material to generate the first batch comprising:
cutting, with the cutting machine, the block of foam along a plurality of first horizontal cutting planes, thereby forming a plurality of horizontal layers, wherein a thickness of the plurality of horizontal layers defines a cross sectional height of the elongate foam inserts, the plurality of first cutting planes being parallel to the input axis;
cutting, with the cutting machine, the plurality of horizontal layers along one or more second transverse cutting planes which extend transverse to the plurality of first horizontal cutting planes, a position of the one or more transverse planes defining a longitudinal length of the elongate foam inserts;
cutting, with the cutting machine, the plurality of horizontal layers along a third transverse cutting plane that is transverse to both the first plurality of first horizontal cutting planes and the one or more second transverse cutting planes, a position of the third transverse cutting plane defining a cross sectional depth of the elongate foam inserts, thereby generating a first batch of elongate foam inserts having a cross sectional height defined by the plurality of first horizontal cutting planes, a longitudinal length defined by the one or more second transverse cutting planes, and a cross sectional depth defined by the third transverse cutting plane, the first batch comprising a number of elongate foam inserts sufficient to fully fill a single shell of a first comfort device; and
moving the first batch of elongate foam inserts away from a remainder of the block of foam material so as to space the first batch of elongate inserts away from the remainder of the block of foam material prior to any additional batches of elongate foam inserts being cut from the remainder of the block of foam material;
transferring the first batch of elongate foam inserts to a first output conveyor belt while the remainder of the block of foam material remains on the input conveyor belt;
cutting a second batch of elongate foam inserts from the remainder of the block of foam material, the step of cutting the second batch comprising:
cutting, with the cutting machine, the plurality of horizontal layers along a fourth transverse cutting plane that is transverse to both the plurality of first cutting planes and the one or more second transverse cutting planes, thereby generating a second batch of elongate foam inserts, the second batch comprising a number of elongate foam inserts sufficient to fully fill a second single shell of a second comfort device;
wherein the second batch of elongate foam inserts is spaced at a predetermined distance from the first batch of elongate foam inserts; and
filling the first shell of the first comfort device with the first batch of elongate foam inserts; and
filling the second shell of the second comfort device with the second batch of elongate foam inserts.

2. The method of claim 1, wherein the block of foam material comprises at plurality of materials, and wherein both of the first and second batches of elongate foam inserts comprises a plurality of elongate inserts made of all of the plurality of materials.

3. The method of claim 1, wherein the longitudinal length is at least 5 inches and wherein the cross sectional height and depth are no more than ⅓ of an inch.

4. A method for batch manufacturing of elongate foam inserts for a comfort device, the method comprising:
positioning a block of foam material onto an input conveyor belt of a cutting machine, the input conveyor belt defining an input axis;
transferring the block of foam material along the input conveyor belt to a cutting area of the cutting machine;
cutting the block of foam material along a plurality of first cutting planes thereby forming a plurality of horizontal layers of foam material, the plurality of first cutting planes being parallel to the input axis;
cutting the plurality of horizontal layers along at least a second cutting plane transverse to the plurality of first cutting planes, thereby generating a first batch of elongate foam inserts, the first batch comprising a quantity of elongate foam inserts sufficient to fully fill a single shell of a comfort device;
separating the first batch of elongate foam inserts away from a remainder of the block of foam material;
tumbling the first batch of elongate foam inserts with a mixer; and
discharging the first batch from the mixer into a first shell of a single comfort device.

5. The method of claim 4 further comprising:
adding additional filler material into the mixer;
mixing, via the mixer, the first batch of elongate foam inserts and the additional filler material; and
wherein the step of discharging comprises discharging all of the first batch of elongate foam inserts and all of the additional filler material into the first shell of the single comfort device.

6. The method of claim 5, wherein the additional filler material comprises at least one of: down feathers, loose fiber, ball fiber, wool, shredded foam, or shredded latex.

7. The method of claim 4, wherein the comfort device is a pillow.

8. The method of claim 4 further comprising:
moving the first batch of elongate inserts away from the remainder of the block of foam material;
cutting the plurality of horizontal layers along a third cutting plane of the remainder of the block of foam material thereby generating a second batch of elongate foam inserts, the second batch comprising a number of elongate foam inserts sufficient to fully fill a second shell of a single, additional comfort device;
wherein the step of moving the first batch of elongate inserts comprises spacing the first batch of elongate inserts sufficiently far from the remainder of the block of foam material that the second batch of elongate foam inserts falls onto the cutting machine at a position spaced at a predetermined distance from the first batch of elongate foam inserts.

9. The method of claim 8, wherein the second batch of elongate foam inserts is generated after the first batch is separated away from the remainder of the block of foam material.

10. The method of claim 4, wherein the block of foam material comprises a plurality of different materials.

11. The method of claim 10, wherein the first batch of elongate foam inserts comprises all of the plurality of different materials.

12. The method of claim 4, wherein:
varying locations and numbers of the cuts to change a fill ratio of the first batch of elongate inserts for the single comfort device; and
varying locations and numbers of the second cuts to change a fill ratio of the second batch of elongate foam inserts for the single comfort device.

13. A method for efficient, batch manufacturing of elongate foam inserts, the method comprising:
cutting a first batch of elongate foam inserts from a block of foam material;
moving the first batch of elongate foam inserts away from a remainder of the block of foam material so as to space the first batch of elongate foam inserts away from the remainder of the block of foam material before any additional elongate foam inserts are cut from the remainder of the block of foam material; and
cutting a second batch of elongate inserts from the remainder of the block of foam material,
wherein the step of moving the first batch of elongate foam inserts comprises spacing the first batch of elongate inserts a distance away from the remainder sufficient to maintain a predetermined minimum spacing between the first batch and the second batch after the second batch of elongate inserts falls away from the remainder of the block of foam material.

14. The method of claim 13 further comprising discharging the first batch into a shell of a comfort device, separately from the second batch.

15. The method of claim 13, wherein the step of cutting a first batch of elongate inserts comprises cutting the block of foam material into a plurality of horizontal layers and along at least a first transverse cutting plane, a height of the plurality of horizontal layers defining a first cross sectional dimension of the first batch of elongate foam inserts, and wherein a position of the first transverse cutting plane defining a second cross sectional dimension of the first batch of elongate foam inserts.

16. The method of claim 13, wherein the block of foam material comprises a plurality of different materials.

17. The method of claim 16, wherein the first batch of elongate foam inserts comprises all of the plurality of different materials.

18. The method of claim 13, additionally comprising varying locations and numbers of the cuts to change a fill ratio of the first batch of elongate inserts for a single comfort device filled with the first batch of elongate foam inserts.

* * * * *